US011336200B2

(12) United States Patent
Shigeta et al.

(10) Patent No.: US 11,336,200 B2
(45) Date of Patent: May 17, 2022

(54) POWER CONVERSION APPARATUS

(71) Applicant: TOSHIBA MITSUBISHI—ELECTRIC INDUSTRIAL SYSTEMS CORPORATION, Chuo-ku (JP)

(72) Inventors: Hiroki Shigeta, Chuo-ku (JP); Toshihide Nakano, Chuo-ku (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 95 days.

(21) Appl. No.: 17/044,959

(22) PCT Filed: Apr. 6, 2018

(86) PCT No.: PCT/JP2018/014667
§ 371 (c)(1),
(2) Date: Oct. 2, 2020

(87) PCT Pub. No.: WO2019/193739
PCT Pub. Date: Oct. 10, 2019

(65) Prior Publication Data
US 2021/0028719 A1    Jan. 28, 2021

(51) Int. Cl.
*H02M 7/217* (2006.01)
*H02J 9/06* (2006.01)
*H02M 1/08* (2006.01)

(52) U.S. Cl.
CPC ............ *H02M 7/217* (2013.01); *H02J 9/061* (2013.01); *H02M 1/08* (2013.01)

(58) Field of Classification Search
CPC ........... H02M 1/08; H02M 7/217; H02J 9/061

USPC ........................................................ 363/127
See application file for complete search history.

(56) References Cited

U.S. PATENT DOCUMENTS 11,205,919 B2 * 12/2021 Ohnishi .................. H02J 9/062
11,211,882 B2 * 12/2021 Kawaguchi ......... H02P 23/0027

FOREIGN PATENT DOCUMENTS

| JP | 8-251947 A | 9/1996 |
|----|------------|--------|
| JP | 2011-113269 A | 6/2011 |

OTHER PUBLICATIONS

International Search Report dated Jun. 5, 2018 in PCT/JP2018/014667 filed Apr. 6, 2018.
Indian Office Action dated Mar. 17, 2021 in Indian Patent Application No. 202017045775 (with English translation), 5 pages.

* cited by examiner

*Primary Examiner* — Yemane Mehari
(74) *Attorney, Agent, or Firm* — Oblon, McClelland, Maier & Neustadt, L.L.P.

(57) ABSTRACT

A controller (5) of an uninterruptible power supply apparatus includes: first to sixth comparator circuits (22a to 22f) respectively provided corresponding to first to sixth IGBTs (Q1 to Q6) and outputting, based on a comparison result of the magnitude of three-phase AC voltages, signals (A1 to A6) indicating that a corresponding IGBT is to be turned on; and a control unit (23) that, when a voltage between terminals (VD1 or VD2) of a first or second capacitor (C11 or C12) is higher than a target voltage (VDT), turns on and off each of the first to sixth IGBTs based on signals output from the first to sixth comparator circuits to decrease the voltage between terminals of the first or second capacitor.

11 Claims, 15 Drawing Sheets

POWER CONVERSION APPARATUS

TECHNICAL FIELD

The present invention relates to power conversion apparatuses, and particularly, to a power conversion apparatus including a rectifier and a converter connected in parallel.

BACKGROUND ART

Japanese Patent Laying-Open No. 08-251947 (PTL 1) discloses a technique of preventing, in a power conversion apparatus including a rectifier and a converter connected in parallel between an alternating-current (AC) power supply and a load, a flow of a loop current through the AC power supply, the rectifier, and the converter by a transformer provided between the AC power supply and at least any one of the rectifier and the converter.

CITATION LIST

Patent Literature

PTL 1: Japanese Patent Laying-Open No. 08-251947

SUMMARY OF INVENTION

Technical Problem

A conventional power conversion apparatus, however, includes the transformer to prevent a flow of loop current, leading to higher cost.

A main object of the present invention is therefore to provide an inexpensive power conversion apparatus capable of preventing a flow of loop current.

Solution to Problem

A power conversion apparatus according to the present invention includes: a converter that generates first to third direct-current (DC) voltages based on first to third AC voltages supplied from an AC power supply and outputs the first to third DC voltages to first to third output nodes, respectively; a first capacitor connected between the first and second output nodes; a second capacitor connected between the second and third output nodes; a controller that controls the converter such that each of voltages between terminals of the first and second capacitors attains to a target voltage; and a rectifier that rectifies the first to third AC voltages and outputs a fourth DC voltage to between the first and third output nodes.

The converter includes: first to third transistors respectively provided corresponding to the first to third AC voltages, each of the first to third transistors having a first electrode connected to the first output node and a second electrode that receives a corresponding AC voltage; fourth to sixth transistors respectively provided corresponding to the first to third AC voltages, each of the fourth to sixth transistors having a first electrode that receives a corresponding AC voltage and a second electrode connected to the third output node; first to sixth diodes respectively connected in anti-parallel with the first to sixth transistors; and first to third AC switches respectively provided corresponding to the first to third AC voltages, each of the first to third AC switches having a first terminal that receives a corresponding AC voltage and a second terminal connected to the second output node.

The controller includes: first to third comparator circuits respectively provided corresponding to the first to third transistors, each of the first to third comparator circuits comparing magnitude of the first to third AC voltages and outputting a signal that allows a corresponding transistor to be turned on when an AC voltage corresponding to the corresponding transistor is higher than other two AC voltages; fourth to sixth comparator circuits respectively provided corresponding to the fourth to sixth transistors, each of the fourth to sixth comparator circuits comparing magnitude of the first to third AC voltages and outputting a signal that allows a corresponding transistor to be turned on when an AC voltage corresponding to the corresponding transistor is lower than other two AC voltages; and a control unit that, when the voltage between terminals of at least any one capacitor of the first and second capacitors is higher than the target voltage, turns on and off each of the first to third transistors based on signals output from the first to sixth comparator circuits to decrease the voltage between terminals of the at least any one capacitor of the first and second capacitors.

Advantageous Effects of Invention

In the power conversion apparatus according to the present invention, the first to third comparator circuits are respectively provided corresponding to the first to third transistors, and each comparator circuit outputs a signal that allows a corresponding transistor to be turned on when an AC voltage corresponding to the corresponding transistor is higher than the other two AC voltages. The fourth to sixth comparator circuits are respectively provided corresponding to the fourth to sixth transistors, and each comparator circuit outputs a signal that allows a corresponding transistor to be turned on when an AC voltage corresponding to the corresponding transistor is lower than the other two AC voltages. When the voltage between terminals of the first or second capacitor is higher than the target voltage, the control unit turns on and off each of the first to sixth transistors based on the signals output from the first to sixth circuits to decrease the voltage between terminals of the first or second capacitor. Thus, a flow of loop current through the AC power supply, the rectifier, and the converter can be prevented. Also, installation of a transformer is not necessary, leading to a lower cost of the device.

DESCRIPTION OF EMBODIMENTS

Embodiment 1

Figure 1:
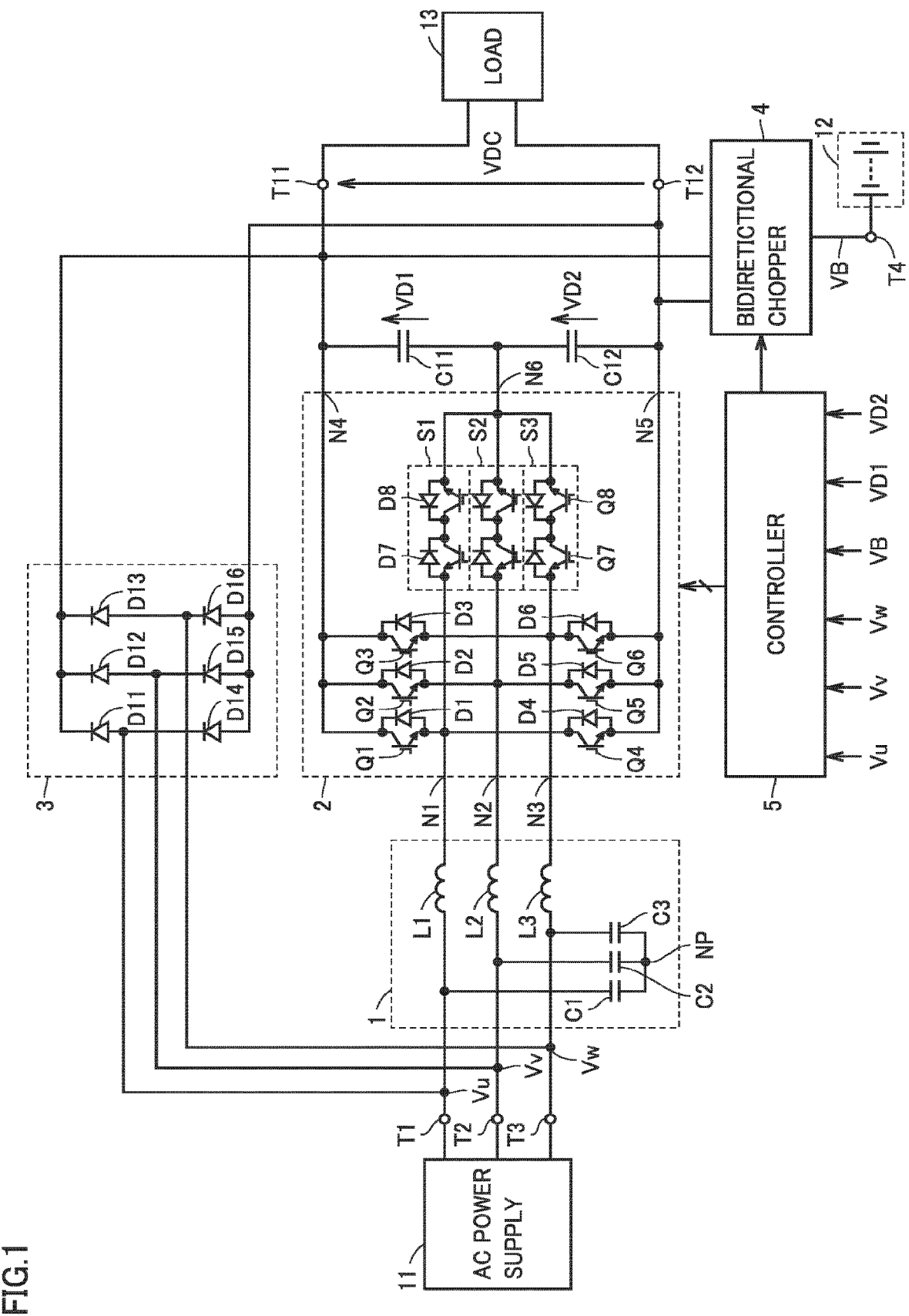
FIG. 1 is a circuit block diagram showing a configuration of an uninterruptible power supply apparatus according to Embodiment 1 of the present invention.

FIG. 1 is a circuit block diagram showing a configuration of an uninterruptible power supply apparatus according to Embodiment 1 of the present invention. With reference to FIG. 1, this uninterruptible power supply apparatus includes input terminals T1 to T3, a battery terminal T4, output terminals T11 and T12, a filter 1, a converter 2, capacitors C11 and C12, a rectifier 3, a bidirectional chopper 4, and a controller 5.

Input terminals T1 to T3 receive a U-phase AC voltage Vu (first AC voltage), a V-phase AC voltage Vv (second AC voltage), and a W-phase AC voltage Vw (third AC voltage), respectively, from an AC power supply 11. Three-phase AC voltages Vu, Vv, and Vw each have a commercial frequency, and three-phase AC voltages Vu, Vv, and Vw are out of phase with respect to each other by 120 degrees. Instantaneous values of three-phase AC voltages Vu, Vv, and Vw are detected by controller 5.

Battery terminal T4 is connected to a battery 12 (power storage device). An instantaneous value of a voltage between terminals VB of battery 12 is detected by controller 5. A capacitor may be connected in place of battery 12. A load 13 is connected between output terminals T11 and T12. Load 13 is driven with DC power supplied from the uninterruptible power supply apparatus.

Filter 1 includes capacitors C1 to C3 and reactors L1 to L3. Capacitors C1 to C3 have first electrodes respectively connected to input terminals T1 to T3 and second electrodes connected together to a neutral point NP. Neutral point NP receives, for example, a ground voltage. Reactors L1 to L3 have first terminals respectively connected to input terminals T1 to T3 and second terminals respectively connected to input nodes N1 to N3 of converter 2.

Filter 1 is a low-pass filter, which causes a current of commercial frequency from AC power supply 11 to pass through converter 2 to prevent a current of a switching frequency generated in converter 2 from flowing into the AC power supply 11 side.

Converter 2 includes insulated gate bipolar transistors (IGBTs) Q1 to Q6, diodes D1 to D6, and AC switches S1 to S3. IGBTs Q1 to Q3 have collectors connected together to an output node N4 (first output node) and emitters respectively connected to input nodes N1 to N3. A positive voltage (first DC voltage) is output to output node N4. Output node N4 is connected to output terminal T11.

IGBTs Q4 to Q6 have collectors respectively connected to input nodes N1 to N3 and emitters connected together to an output node N5 (third output node). A negative voltage (third DC voltage) is output to output node N5. Output node N5 is connected to output terminal T12. Diodes D1 to D6 are connected in anti-parallel with IGBTs Q1 to Q6, respectively. Each of IGBTs Q1 to Q6 is controlled by controller 5 to be turned on and off.

AC switches S1 to S3 have first terminals respectively connected to input nodes N1 to N3 and second terminals connected together to an output node N6 (second output node). A neutral point voltage (second DC voltage) is output to output node N6. Output node N6 is connected to, for example, neutral point NP.

Each of AC switches S1 to S3 has IGBTs Q7 and Q8 and diodes D7 and D8. IGBTs Q7 and Q8 have collectors connected to each other, IGBT Q7 has an emitter connected to a first terminal (corresponding input node), and IGBT Q8 has an emitter connected to a second terminal (node N6). Diodes D7 and D8 are respectively connected in anti-parallel with IGBTs Q7 and Q8. Each of IGBTs Q7 and Q8 belonging to switches S1 to S3 is controlled by controller 5 to be turned on and off.

In each of switches S1 to S3, the emitters of IGBTs Q7 and Q8 may be connected to each other, the collector of IGBT Q8 may be connected to the first terminal (corresponding input node), the collector of IGBT Q7 may be connected to the second terminal (node N6), and diodes D7 and D8 may be respectively connected in anti-parallel with IGBTs Q7 and Q8.

Converter 2 is controlled by controller 5. When three-phase AC power is supplied normally from AC power supply 11 (during normal operation of AC power supply 11), converter 2 generates a positive voltage, a negative voltage, and a neutral point voltage based on three-phase AC voltages Vu, Vv, and Vw supplied from AC power supply 11 through filter 1 and outputs the positive voltage, the negative voltage, and the neutral point voltage to output nodes N4 to N6, respectively. When the supply of the three-phase AC power from AC power supply 11 is stopped (during power failure of AC power supply 11), the operation of converter 2 is stopped.

Capacitor C11 is connected between output nodes N4 and N6 of converter 2 for smoothing a DC voltage VD1 between output nodes N4 and N6. Capacitor C12 is connected between output nodes N6 and N5 of converter 2 for smoothing a DC voltage VD2 between output nodes N6 and N5.

An instantaneous value of a voltage between terminals (a DC voltage between nodes N4 and N6) VD1 of capacitor C11 is detected by controller 5. An instantaneous value of a voltage between terminals (a DC voltage between nodes N6 and N5) VD2 of capacitor C12 is detected by controller 5.

Controller 5 determines whether a power failure has occurred in AC power supply 11 based on three-phase AC voltages Vu, Vv, and Vw. For example, controller 5 determines that a power failure has occurred in AC power supply 11 when the AC voltage of any one of three-phase AC voltages Vu, Vv, and Vw falls below a lower limit. Controller 5 determines that AC power supply 11 operates normally when three-phase AC voltages Vu, Vv, and Vw are each above the lower limit.

During normal operation of AC power supply 11, controller 5 controls converter 2 based on three-phase AC voltages Vu, Vv, and Vw such that voltage between terminals VD1 of capacitor C11 attains to a target voltage VDT and voltage between terminals VD2 of capacitor C12 attains to target voltage VDT. This causes a DC voltage VDC between output terminals T11 and T12 to attain to a voltage 2VDT twice as high as target voltage VDT.

During power failure of AC power supply 11, controller 5 turns off all IGBTs Q1 to Q8 to stop the operation of converter 2. A method of operating converter 2 during normal operation of AC power supply 11 will be described below in detail.

Rectifier 3 includes diodes D11 to D16. Diodes D11 to D13 have anodes respectively connected to input terminals T1 and T3 and cathodes connected together to output terminal T11. Diodes D14 to D16 have anodes connected together to output terminal T12 and cathodes respectively connected to the anodes of diodes D11 to D13.

Rectifier 3 subjects three-phase AC voltages Vu, Vv, and Vw supplied from AC power supply 11 to full-wave rectification, thereby generating DC voltage Vdc. DC output voltage Vdc of rectifier 3 is lower than voltage 2VDT twice as high as target voltage VDT described above.

During normal operation of converter 2, thus, diodes D11 to D16 of rectifier 3 are kept at OFF state, so that rectifier 3 supplies no DC power to load 13. When DC output voltage VDC falls to DC output voltage Vdc of rectifier 3 due to a failure of converter 2, two diodes of diodes D11 to D16 are sequentially turned on in synchronization with three-phase AC voltages Vu, Vv, and Vw, so that rectifier 3 supplies DC power to load 13.

Bidirectional chopper 4 is connected between output terminals T11 and T12 and battery terminal T4 and is controlled by controller 5. Bidirectional chopper 4 stores DC power supplied from converter 2 (or rectifier 3) in battery 12 during normal operation of AC power supply 11 and supplies DC power of battery 12 to load 13 during power failure of AC power supply 11.

Controller 5 controls bidirectional chopper 4 during normal operation of AC power supply 11 such that voltage between terminals VB of battery 12 attains to target battery voltage VBT and controls bidirectional chopper 4 during power failure of AC power supply 11 such that a voltage (VD1+VD2), which is a sum of voltages between terminals VD1 and VD2 of capacitors C11 and C12, attains to voltage 2VDT twice as high as target voltage VDT, where 2VDT>VBT.

Bidirectional chopper 4 may be connected to output nodes N4 to N6. In this case, controller 5 controls bidirectional chopper 4 during normal operation of AC power supply 11 such that voltage between terminals VB of battery 12 attains to target battery voltage VBT and controls bidirectional chopper 4 during power failure of AC power supply 11 such that each of voltages between terminals VD1 and VD2 of capacitors C11 and C12 attains to target voltage VDT.

Next, an operation of this uninterruptible power supply apparatus will be described. During normal operation of AC power supply 11, three-phase AC power is supplied to converter 2 from AC power supply 11 through filter 1. The three-phase AC power is converted into DC power by converter 2 and is supplied to load 13 and is also stored in battery 12 by bidirectional chopper 4. Load 13 is driven with the DC power supplied from converter 2.

When converter 2 fails during normal operation of AC power supply 11, the three-phase AC power supplied from AC power supply 11 is converted into DC power by rectifier 3. The DC power generated by rectifier 3 is supplied to load 13 and is also stored in battery 12 by bidirectional chopper 4. Even when converter 2 fails during normal operation of AC power supply 11, thus, the operation of load 13 can be continued.

During power failure of AC power supply 11, the operation of converter 2 is stopped, diodes D11 to D16 of rectifier 3 are kept at OFF state, and the DC power of battery 12 is supplied to load 13 by bidirectional chopper 4. During a period in which DC power is stored in battery 12, thus, the operation of load 13 can be continued.

In the uninterruptible power supply apparatus having the above configuration, when converter 2 is operated irrespective of the magnitude of three-phase AC voltages Vu, Vv, and Vw as in a conventional uninterruptible power supply apparatus, a loop current IL flows from AC power supply 11 through rectifier 3, converter 2, and filter 1 to AC power supply 11 or flows through the opposite path, which may cause a loss.

Figure 2:
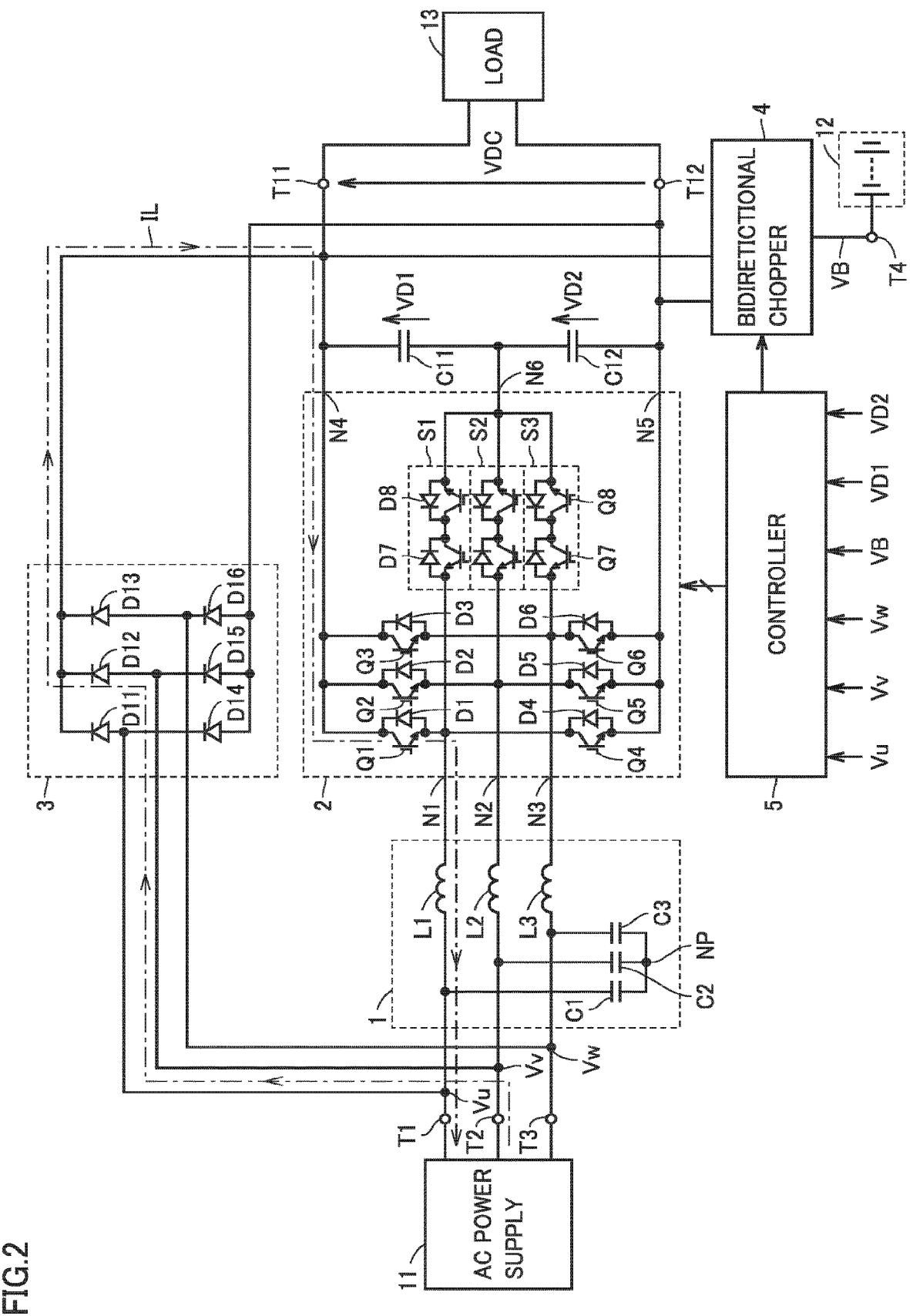
FIG. 2 is a circuit block diagram for illustrating a conventional problem.

For example, when IGBT Q1 is turned on during a period in which AC voltage Vv is higher than AC voltage Vu, loop current IL flows from a V-phase terminal of AC power supply 11 through input terminal T2, diode D12, IGBT Q1, reactor L1, and input terminal T1 to a U-phase terminal of AC power supply 11, as shown in FIG. 2.

Similarly, when IGBT Q1 is turned on during a period in which AC voltage Vw is higher than AC voltage Vu, loop current IL flows from a W-phase terminal of AC power supply 11 through input terminal T3, diode D13, IGBT Q1, reactor L1, and input terminal T1 to the U-phase terminal of AC power supply 11.

Figure 3:
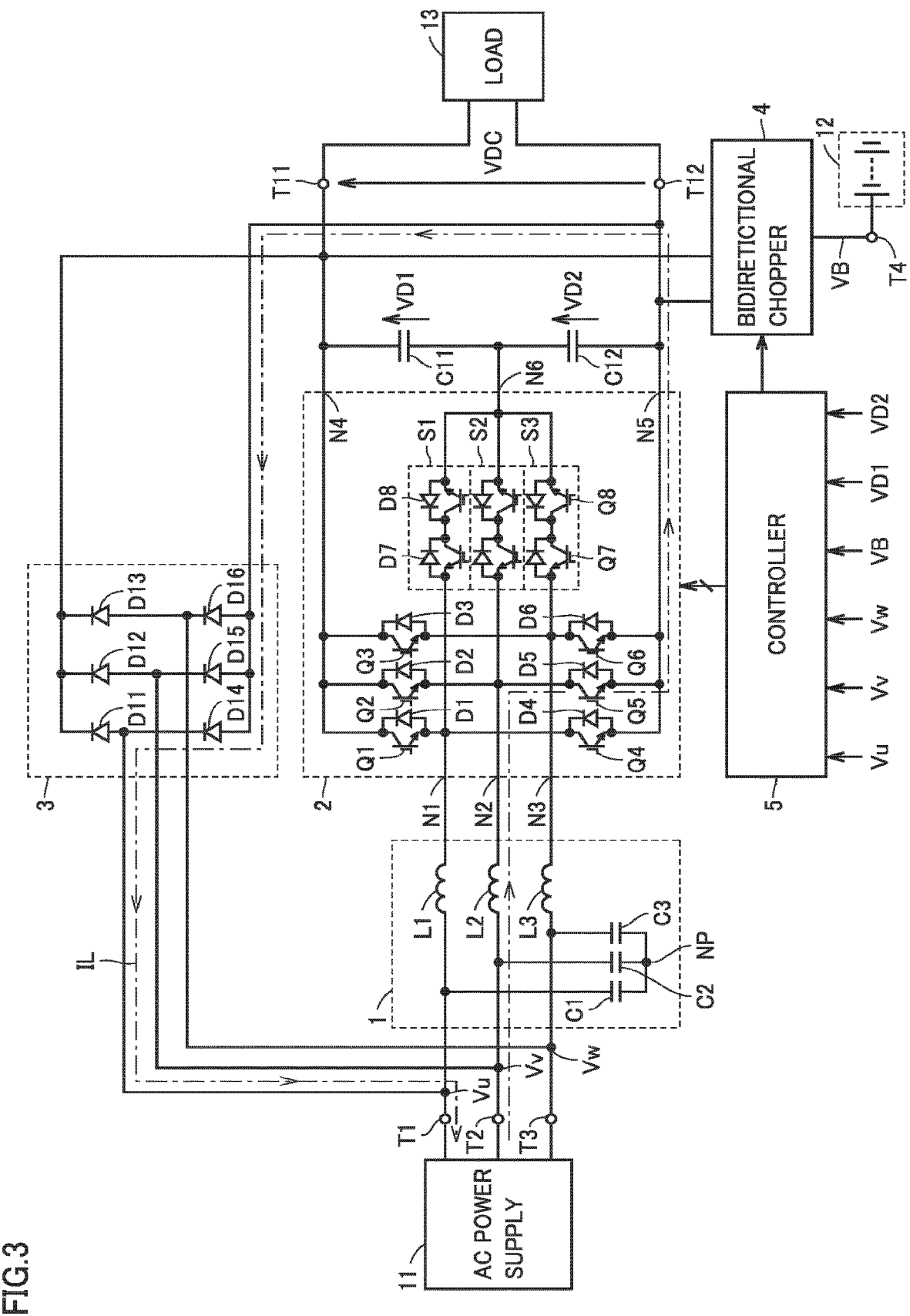
FIG. 3 is another circuit block diagram for illustrating a conventional problem.

When IGBT Q5 is turned on during the period in which AC voltage Vv is higher than AC voltage Vu, loop current IL flows from the V-phase terminal of AC power supply 11 through input terminal T2, reactor L2, IGBT Q5, diode D14, and input terminal T1 to the U-phase terminal of AC power supply 11, as shown in FIG. 3.

Similarly, when IGBT Q5 is turned on during a period in which AC voltage Vv is higher than AC voltage Vw, loop current IL flows from the V-phase terminal of AC power supply 11 through input terminal T2, reactor L2, IGBT Q5, diode D16, and input terminal T3 to the W-phase terminal of AC power supply 11. The invention of the present application aims to solve this problem.

Figure 4:
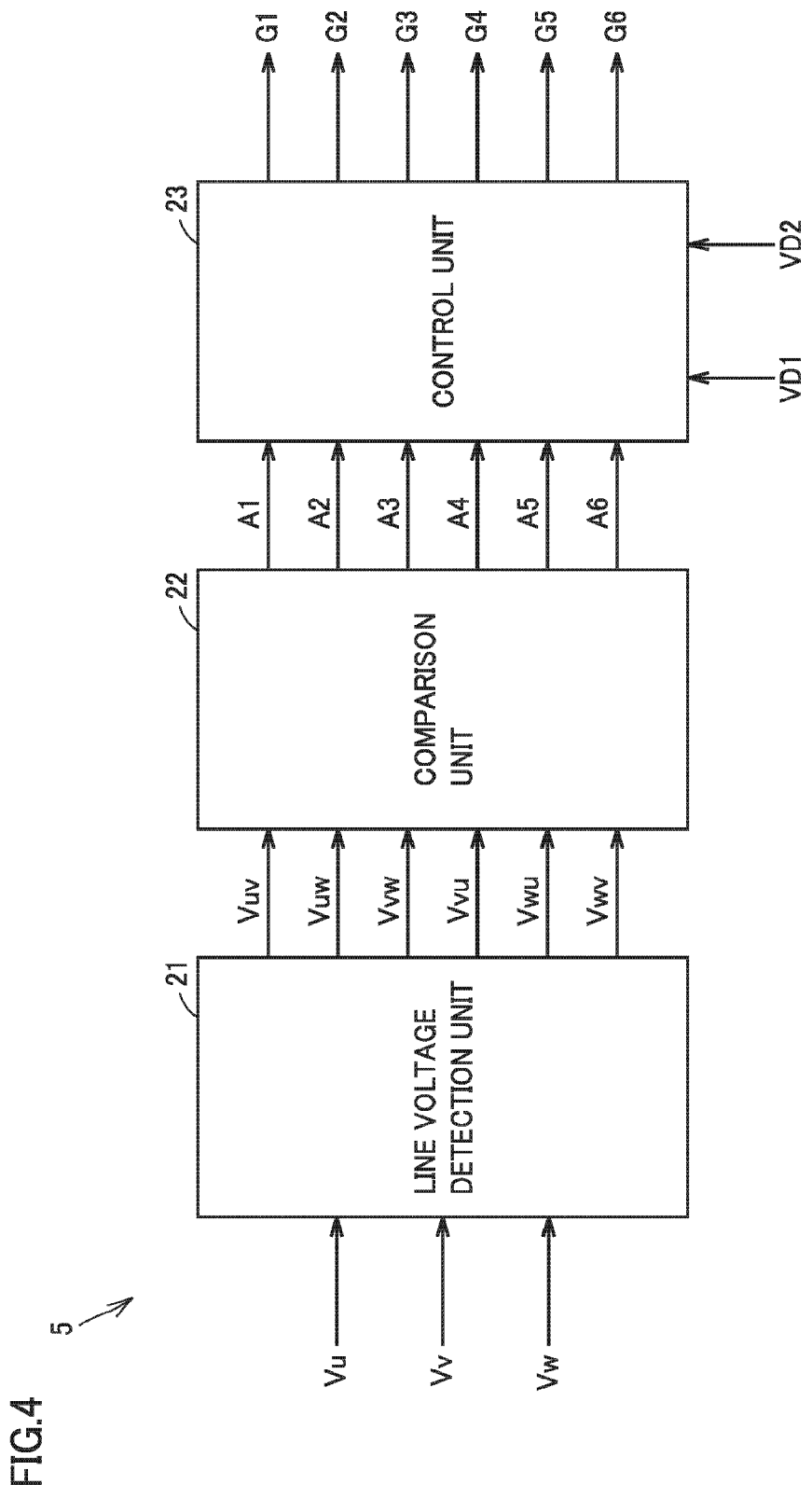
FIG. 4 is a block diagram showing a configuration of a part of a controller shown in FIG. 1, which controls a converter to discharge capacitors C11 and C12.

FIG. 4 is a block diagram showing a configuration of a part of controller 5, which controls converter 2 to discharge capacitors C11 and C12. With reference to FIG. 4, controller 5 includes a line voltage detection unit 21, a comparison unit 22, and a control unit 23.

Line voltage detection unit 21 detects line voltages Vuv, Vuw, Vvw, Vvu, Vwu, and Vwv based on three-phase AC voltages Vu, Vv, and Vw supplied from AC power supply 11. Line voltages Vuv and Vuw are U-phase voltages respectively seen from the V-phase sand the W-phase. Line voltages Vvw and Vvu are V-phase voltages respectively seen from the W-phase and the U-phase. Line voltages Vwu and Vwv are W-phase voltages respectively seen from the U-phase and the V-phase.

Figure 5:
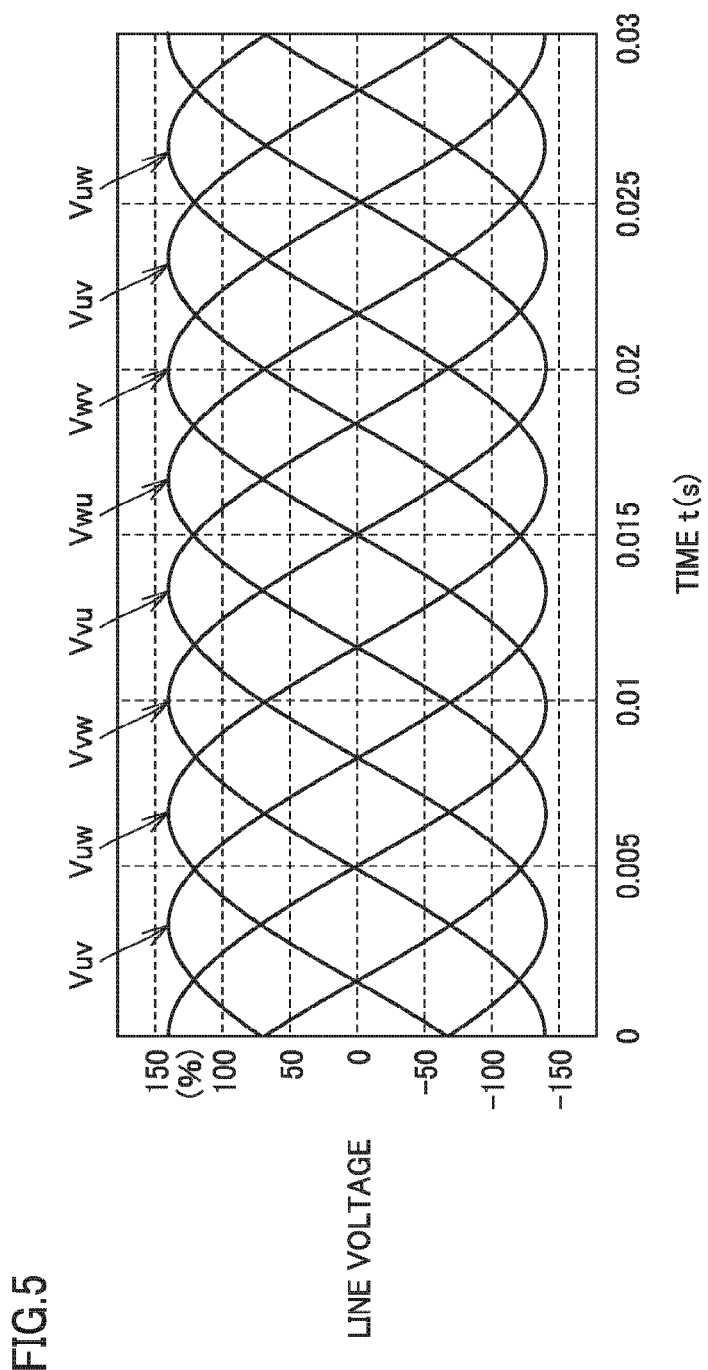
FIG. 5 is a timing diagram showing wave forms of line voltages shown in FIG. 4.

FIG. 5 is a wave form chart showing line voltages Vuv, Vuw, Vvw, Vvu, Vwu, and Vwv. In FIG. 5, the effective value of the line voltage is indicated as 100%. Each of three-phase AC voltages Vu, Vv, and Vw changes in the shape of sine wave at 60 Hz, and three-phase AC voltages Vu, Vv, and Vw are out of phase with respect to each other by 120 degrees. Each of line voltages Vuv, Vuw, Vvw, Vvu, Vwu, and Vwv thus changes in the shape of sine wave at 60 Hz, and line voltages Vuv, Vuw, Vvw, Vvu, Vwu, and Vwv are out of phase with respect to each other by 60 degrees.

Referring back to FIG. 4, comparison unit 22 determines whether IGBTs Q1 to Q6 can be turned on based on line voltages Vuv, Vuw, Vvw, Vvu, Vwu, and Vwv without flowing loop current IL and outputs signals A1 to A6 indicative of determination results. Signals A1 to A6 are rendered "H" level, which is an activation level, when IGBTs Q1 to Q6 may be rendered ON state. Signals A1 to A6 are rendered "L" level, which is a deactivation level, when IGBTs Q1 to Q6 should not be rendered ON state.

Figure 6:
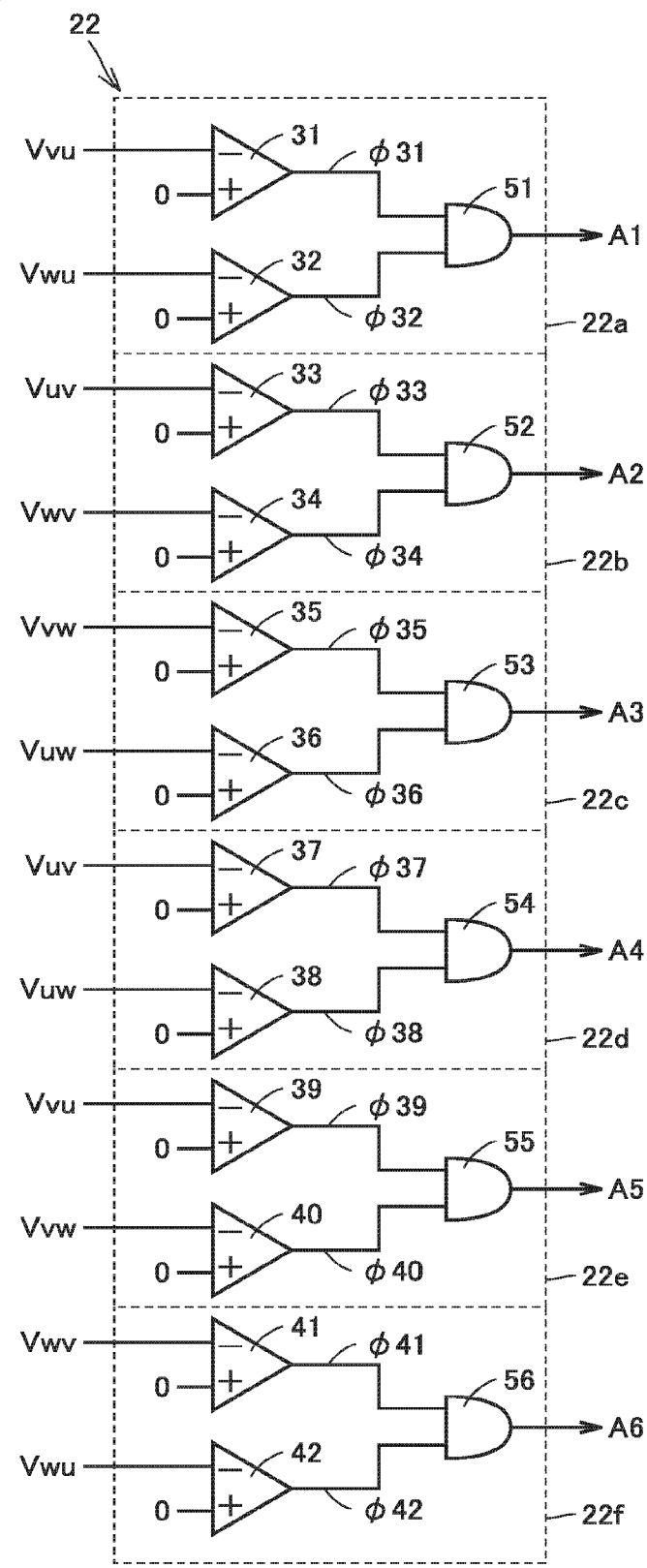
FIG. 6 is a circuit diagram showing a configuration of a comparison unit shown in FIG. 4.

FIG. 6 is a circuit diagram showing a configuration of comparison unit 22. With reference to FIG. 6, comparison unit 22 includes comparators 31 to 42 and AND gates 51 to 56. Inverting input terminals (− terminals) of comparators 31 to 42 receive line voltages Vvu, Vwu, Vuv, Vwv, Vvw, Vuw, Vuv, Vuw, Vvu, Vvw, Vwv, and Vwu, respectively. All of non-inverting input terminals (+terminals) of comparators 31 to 42 receive 0 V.

Output signals φ31 to φ42 of comparators 31 to 42 are at "H" level when line voltages Vvu, Vwu, Vuv, Vwv, Vvw, Vuw, Vuv, Vuw, Vvu, Vvw, Vwv, and Vwu are negative voltages and are "L" level when line voltages Vvu, Vwu, Vuv, Vwv, Vvw, Vuw, Vuv, Vuw, Vvu, Vvw, Vwv, and Vwu are positive voltages.

Output signals φ31, φ33, φ35, φ37, φ39, and φ41 of comparators 31, 33, 35, 37, 39, and 41 are respectively supplied to first input nodes of AND gates 51 to 56, and output signals φ32, φ34, φ36, φ38, φ40, and φ42 of comparators 32, 34, 36, 38, 40, and 42 are respectively supplied to second input nodes of AND gates 51 to 56. AND gates 51 to 56 output signals A1 to A6, respectively.

Figure 7:
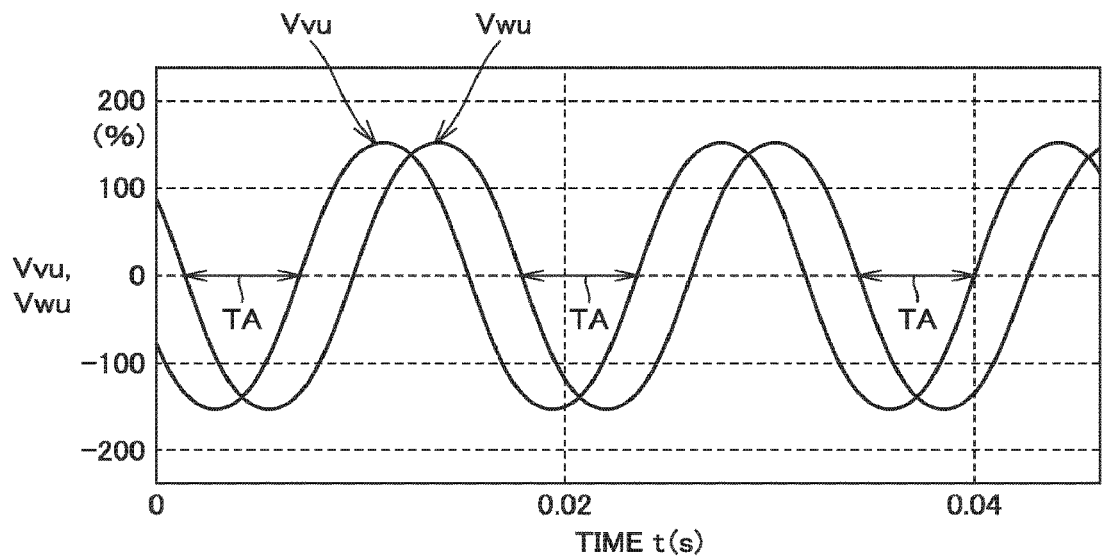
FIG. 7 is a timing diagram for illustrating an operation of the comparison unit shown in FIG. 6.

It has been described with reference to FIG. 2 that loop current IL flows as IGBT Q1 is turned on during the period in which AC voltage Vu is lower than AC voltages Vv and Vw. However, loop current IL does not flow as IGBT Q1 is turned on during the period in which AC voltage Vu is higher than AC voltages Vv and Vw. Thus, the period in which AC voltage Vu is higher than AC voltages Vv and Vw, that is, a period TA in which both of line voltages Vvu and Vwu are negative voltages, as shown in FIG. 7, is a period in which IGBT Q1 may be turned on.

Referring back to FIG. 6, output signal φ31 of comparator 31 is at "H" level during the period in which line voltage Vvu is a negative voltage and is at "L" level during the period in which line voltage Vvu is a positive voltage. Output signal φ32 of comparator 32 is at "H" level during the period in which line voltage Vwu is a negative voltage and is at "L" level during the period in which line voltage Vwu is a positive voltage.

Output signal A1 of AND gate 51 is at "H" level during a period in which both of signals φ31 and φ32 are at "H" level, that is, a period in which both of line voltages Vvu and Vwu are negative voltages. Thus, a period in which signal A1 is at "H" level is the period in which IGBT Q1 may be turned on.

Similarly, a period in which both of line voltages Vuv and Vwv are negative voltages and signal A2 is at "H" level is a period in which IGBT Q2 may be turned on. A period in which both of line voltages Vvw and Vuw are negative voltages and signal A3 is at "H" level is a period in which IGBT Q3 may be turned on.

Comparators 31 and 32 and AND gate 51 constitute a first comparator circuit 22a, which is provided corresponding to IGBT Q1, compares the magnitude of three-phase AC voltages Vu, Vv, and Vw, and when AC voltage Vu corresponding to a corresponding IGBT Q1 is higher than the other two AC voltages Vv and Vw, renders signal A1 to "H" level to allow the corresponding IGBT Q1 to be turned on.

Comparators 33 and 34 and AND gate 52 constitute a second comparator circuit 22b, which is provided corresponding to IGBT Q2, compares the magnitude of three-phase AC voltages Vu, Vv, and Vw and, when AC voltage Vv corresponding to a corresponding IGBT Q2 is higher than the other two AC voltages Vu and Vw, renders signal A2 to "H" level to allow the corresponding IGBT Q2 to be turned on.

Comparators 35 and 36 and AND gate 53 constitute a third comparator circuit 22c, which is provided corresponding to IGBT Q3, compares the magnitude of three-phase AC voltages Vu, Vv, and Vw and, when AC voltage Vw corresponding to a corresponding IGBT Q3 is higher than the other two AC voltages Vu and Vv, renders signal A3 to "H" level to allow the corresponding IGBT Q3 to be turned on.

It has been described with reference to FIG. 3 that loop current IL flows as IGBT Q5 is turned on during the period in which AC voltage Vv is higher than AC voltages Vu and Vw. As IGBT Q5 is turned on during the period in which AC voltage Vv is lower than AC voltages Vu and Vw, however, loop current IL does not flow. Thus, the period in which AC voltage Vv is lower than AC voltages Vu and Vw, that is, a period in which both of line voltages Vvu and Vvw are negative voltages, is a period in which IGBT Q5 may be turned on.

Referring back to FIG. 6, output signal φ39 of comparator 39 is at "H" level during the period in which line voltage Vvu is a negative voltage and is at "L" level during the period in which line voltage Vvu is a positive voltage. Output signal φ40 of comparator 40 is at "H" level during a period in which line voltage Vvw is a negative voltage and is at "L" level during a period in which line voltage Vvw is a positive voltage.

Output signal A5 of AND gate 55 is at "H" level during a period in which both of signals φ39 and φ40 are at "H" level, that is, the period in which both of line voltages Vvu and Vvw are negative voltages. Thus, the period in which signal A5 is at "H" level is the period in which IGBT Q5 may be turned on.

Similarly, a period in which both of line voltages Vuv and Vuw are negative voltages and signal A4 is at "H" level is a period in which IGBT Q4 may be turned on. A period in which both of line voltages Vwv and Vwu are negative voltages and signal A6 is at "H" level is a period in which IGBT Q6 may be turned on.

Comparators 37 and 38 and AND gate 54 constitute a fourth comparator circuit 22d, which is provided corresponding to IGBT Q4, compares the magnitude of three-phase AC voltages Vu, Vv, and Vw, and when AC voltage Vu corresponding to a corresponding IGBT Q4 is lower than the other two AC voltages Vv and Vw, renders signal A4 to "H" level to allow the corresponding IGBT Q4 to be turned on.

Comparators 39 and 40 and AND gate 55 constitute a fifth comparator circuit 22e, which is provided corresponding to IGBT Q5, compares the magnitude of three-phase AC voltages Vu, Vv, and Vw, and when AC voltage Vv corresponding to a corresponding IGBT Q5 is lower than the other two AC voltages Vu and Vw, renders signal A5 to "H" level to allow the corresponding IGBT Q5 to be turned on.

Comparators 41 and 42 and AND gate 56 constitute a sixth comparator circuit 22f, which is provided corresponding to IGBT Q6, compares the magnitude of three-phase AC voltages Vu, Vv, and Vw, and when AC voltage Vw corresponding to a corresponding IGBT Q6 is lower than the other two AC voltages Vu and Vv, renders signal A6 to "H" level to allow the corresponding IGBT Q6 to be turned on.

Figure 8:
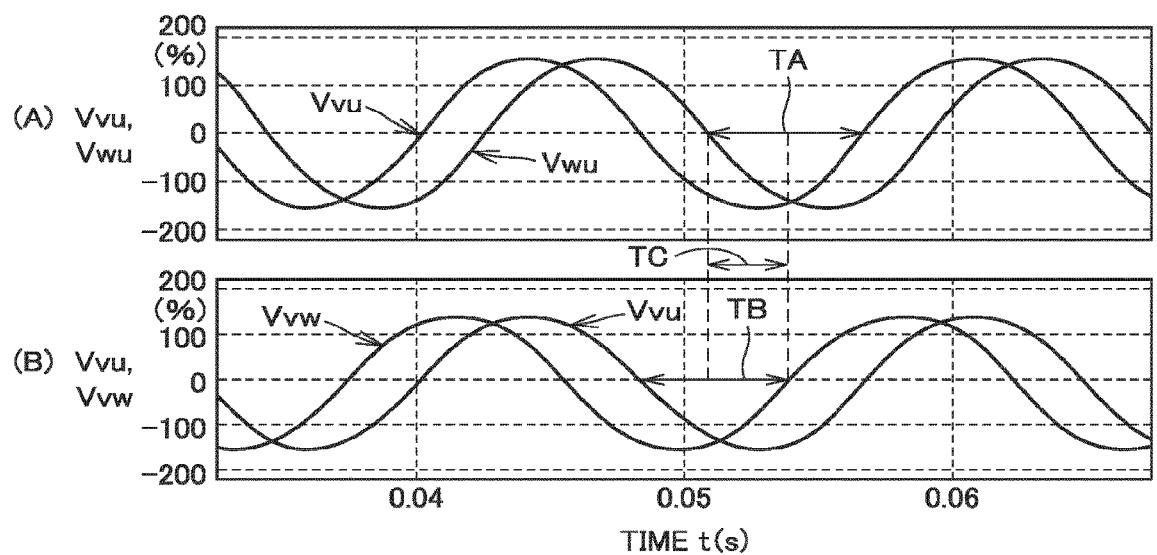
FIG. 8 is another timing diagram for illustrating an operation of the comparison unit shown in FIG. 6.
Figure 9:
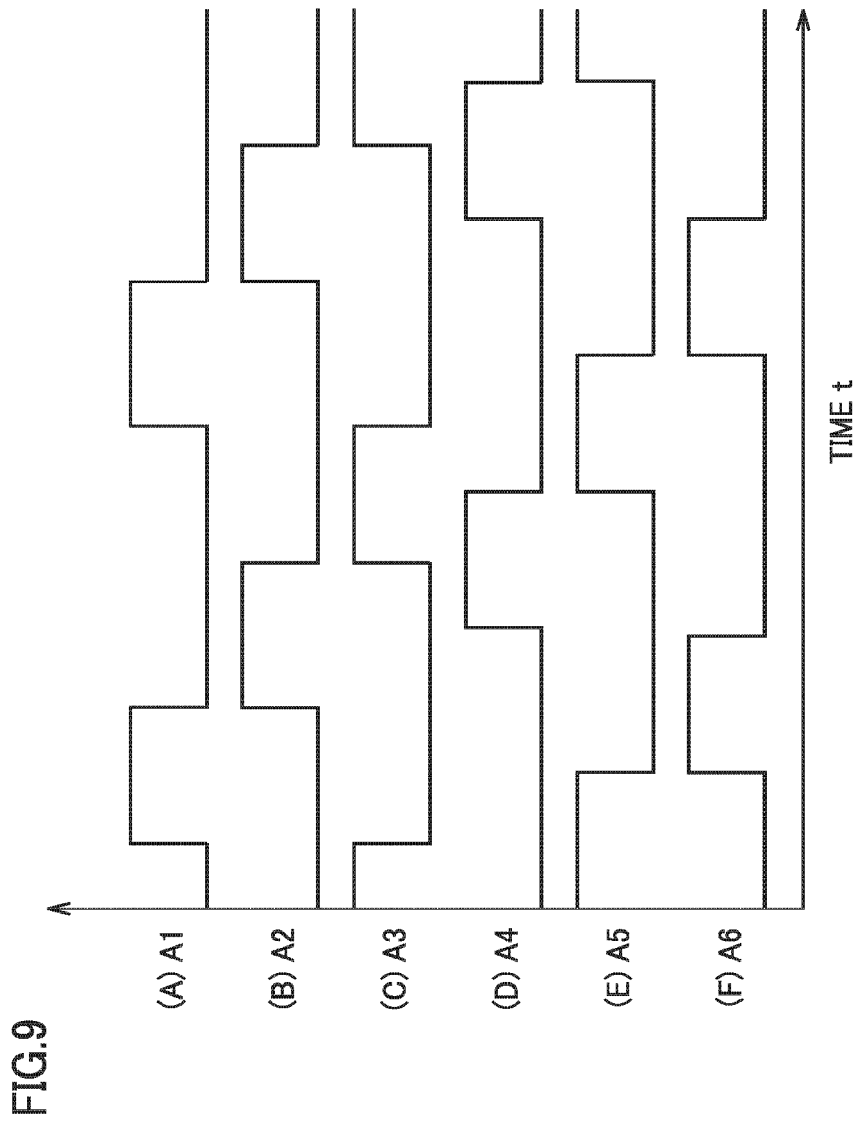
FIG. 9 is a timing diagram showing wave forms of signals A1 to A6 shown in FIG. 6.

FIGS. 8(A) and (B) are timing diagrams showing periods TA and TB in which IGBTs Q1 and Q5 may be turned on, respectively. In FIG. 8(A), period TA in which both of line voltages Vvu and Vwu are negative voltages is the period in which IGBT Q1 may be turned on. In FIG. 8(B), period TB in which both of line voltages Vvu and Vvw are negative voltages is the period in which IGBT Q5 may be turned on. A period TC in which period TA and period TB overlap each other is a period in which both of IGBTs Q1 and Q5 may be simultaneously turned on.

FIGS. 9(A) to (F) are timing diagrams showing wave forms of signals A1 to A6. The frequency of each of signals A1 to A6 is equal to the frequency of each of three-phase AC voltages Vu, Vv, and Vw. Each of signals A1 to A6 is at "H" level for 120 degrees of 360 degrees and is at "L" level for the other 240 degrees. Signals A1 to A3 are out of phase with respect to each other by 120 degrees. Signals A4 to A6 are out of phase with respect to each other by 120 degrees. The phases of signals A1 to A3 are advanced from the phases of signals A4 to A6 by 180 degrees.

Any one signal of signals A1 to A3 and any one signal of signals A4 to A6 enter "H" level simultaneously. Signals A1 and A4 do not enter "H" level simultaneously, signals A2 and A5 do not enter "H" level simultaneously, and signals A3 and A6 do not enter "H" level simultaneously. Thus, IGBTs Q1 and Q4 are not turned on simultaneously, IGBTs Q2 and Q5 are not turned on simultaneously, and IGBTs Q3 and Q6 are not turned on simultaneously.

Referring back to FIG. 4, control unit 23 generates gate signals Q1 to Q6 for turning on and off IGBTs Q1 to Q6 based on signals A1 to A6 and voltages between terminals VD1 and VD2 of capacitors C11 and C12.

Figure 10:
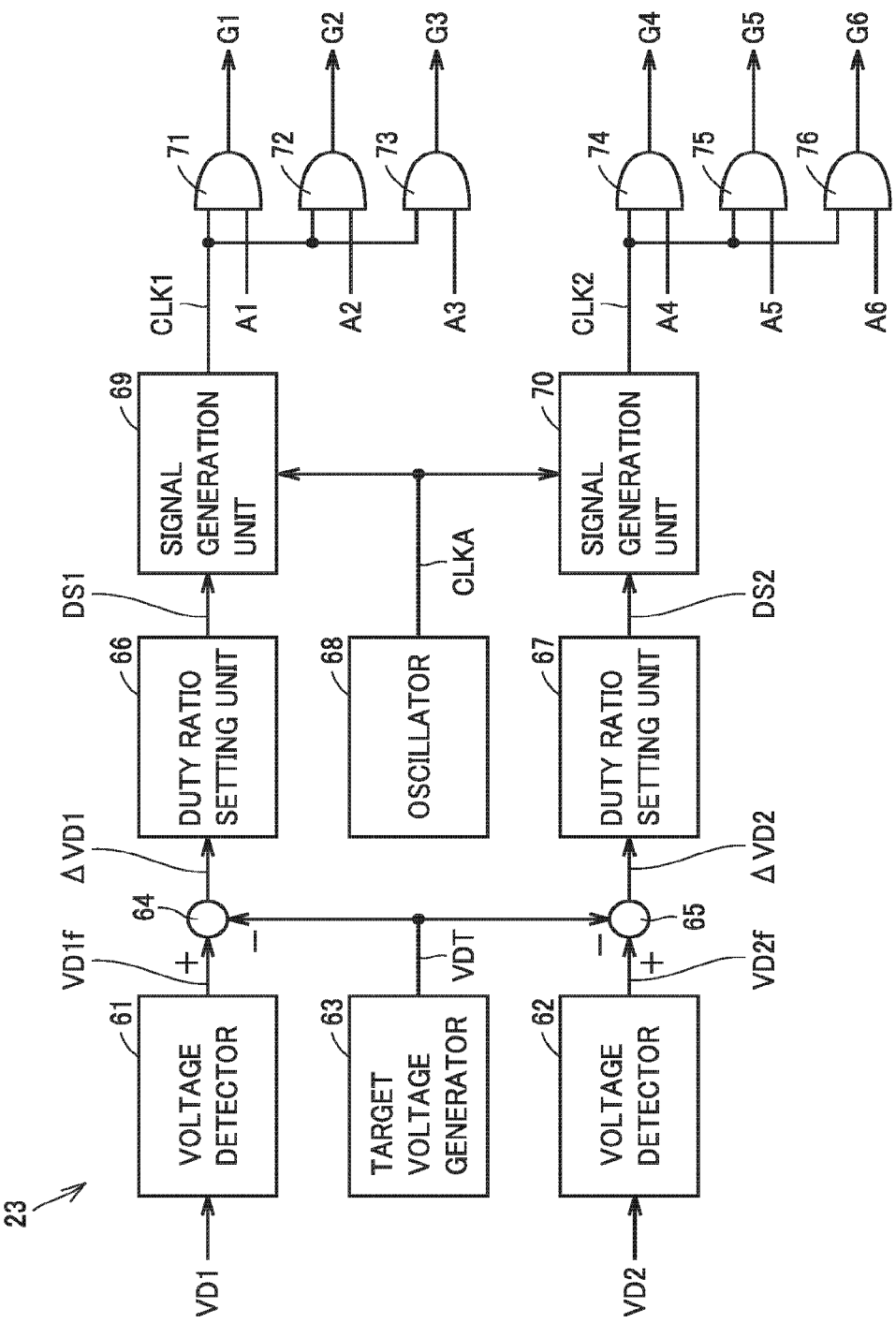
FIG. 10 is a circuit diagram showing a configuration of a control unit shown in FIG. 4.

FIG. 10 is a circuit block diagram showing a configuration of control unit 23. With reference to FIG. 10, control unit 23 includes voltage detectors 61 and 62, a target voltage generator 63, subtractors 64 and 65, duty ratio setting units 66 and 67, an oscillator 68, signal generation units 69 and 70, and AND gates 71 to 76.

Voltage detector 61 detects an instantaneous value of voltage between terminals VD1 of capacitor C11 and outputs a signal VD1f indicative of the detected value. Voltage detector 62 detects an instantaneous value of voltage between terminals VD2 of capacitor C12 and outputs a signal VD2f indicative of the detected value. Target voltage generator 63 generates target voltage VDT.

Subtractor 64 determines a deviation ΔVD1=VD1f−VDT between signal VD1f and target voltage VDT. Subtractor 65 determines a deviation ΔVD2=VD2f−VDT between signal VD2f and target voltage VDT. Duty ratio setting unit 66 multiplies deviation ΔVD1 by a gain to generate a duty ratio setting signal DS1. Duty ratio setting unit 67 multiplies deviation ΔVD2 by a gain to generate a duty ratio setting signal DS2. Duty ratio setting signals DS1 and DS2 are supplied to signal generation units 69 and 70, respectively.

Oscillator 68 generates a clock signal CLKA having a frequency which is an integral multiple (e.g., six times) of the frequencies of three-phase AC voltages Vu, Vv, and Vw in synchronization with three-phase AC voltages Vu, Vv, and Vw. Clock signal CLKA is supplied to signal generation units 69 and 70. Signal generation unit 69 adjusts the duty ratio of clock signal CLKA to generate a clock signal CLK1, based on duty ratio setting signal DS1. The duty ratio of clock signal CLK1 is higher as deviation ΔVD1 is greater. Signal generation unit 70 adjusts the duty ratio of clock signal CLKA to generate a clock signal CLK2, based on duty ratio setting signal DS2. The duty ratio of clock signal CLK2 is higher as deviation ΔVD2 is greater.

AND gates 71 to 73 have first input nodes that receive clock signal CLK1 and second input nodes that receive signals A1 to A3, respectively. The output signals of AND gates 71 to 73 become gate signals G1 to G3, respectively. Gate signals G1 to G3 are supplied to the gates of IGBTs Q1 to Q3, respectively. When gate signals G1 to G3 are at "H" level, IGBTs Q1 to Q3 are turned on, respectively. When gate signals G1 to G3 are at "L" level, IGBTs Q1 to Q3 are turned off, respectively.

AND gates 74 to 76 have first input nodes that receive clock signal CLK2 and second input nodes that receive signals A4 to A6, respectively. The output signals of AND gates 74 to 76 become gate signals G4 to G6, respectively. Gate signals G4 to G6 are supplied to the gates of IGBTs Q4 to Q6, respectively. When gate signals G4 to G6 are at "H" level, IGBTs Q4 to Q6 are turned on, respectively. When gate signals G4 to G6 are at "L" level, IGBTs Q4 to Q6 are turned off, respectively.

Figure 11:
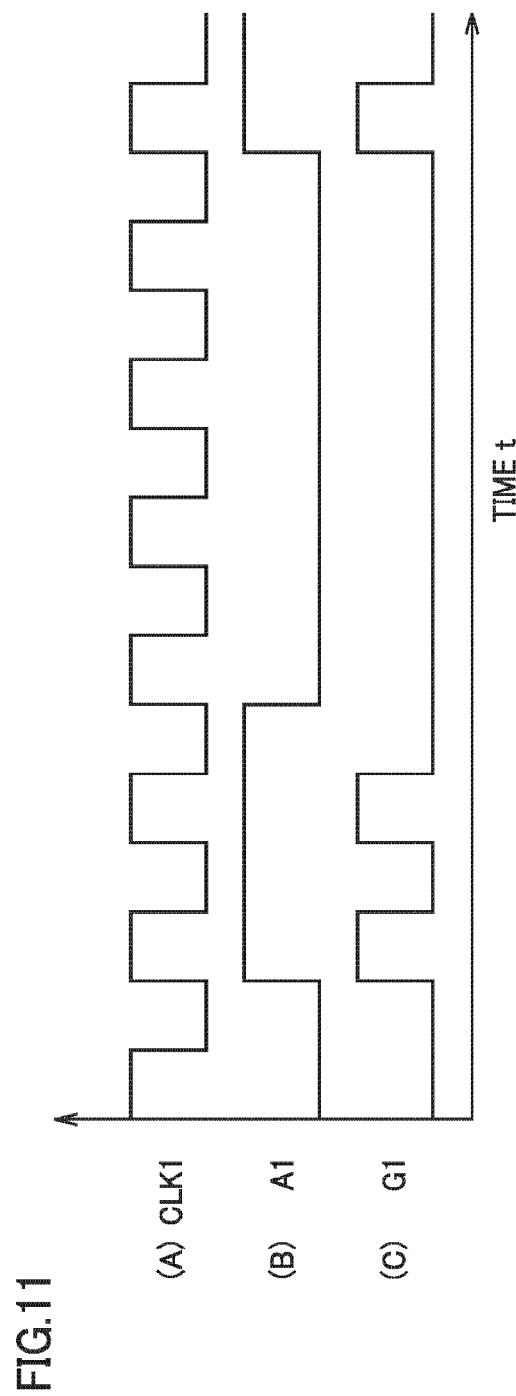
FIG. 11 is a timing diagram showing wave forms of a clock signal CLK1, a signal A1, and a gate signal G1 shown in FIG. 10.

FIGS. 11(A) to (C) are timing diagrams showing wave forms of clock signal CLK1, signal A1, and gate signal G1. Clock signal CLK1 has a frequency which is an integral multiple (e.g., six times) of frequencies of three-phase AC voltages Vu, Vv, and Vw. Clock signal CLK1 and signal A1 are in synchronization with each other. FIG. 11(A) shows the case in which a duty ratio between the time in which clock signal CLK1 is at "H" level and one cycle of clock signal CLK1 is 50%.

During the period in which signal A1 is at "H" level, clock signal CLK1 passes through AND gate 71 (FIG. 10) to become gate signal G1. During a period in which signal A1 is at "L" level, gate signal G1 that is an output signal of AND gate 71 is fixed at "L" level. Thus, IGBT Q1 is turned on and off during the period in which signal A1 is at "H" level, and IGBT Q1 is kept at OFF state during the period in which signal A1 is at "L" level.

Next, the method of discharging capacitors C11 and C12 in this uninterruptible power supply apparatus will be described. Each of voltages between terminals VD1 and VD2 of capacitors C11 and C12 exceeds target voltage VDT when a load current decreases during operation of load 13, load 13 stops suddenly, or a regenerative current occurs in load 13. In this case, capacitors C11 and C12 need to be discharged to decrease voltages between terminals VD1 and VD2 of capacitors C11 and C12.

First, line voltage detection unit 21 (FIG. 4) detects line voltages Vuv, Vuw, Vvw, Vvu, Vwu, and Vwv, and based on the detection result, comparison unit 22 (FIG. 4) generates signals A1 to A6 (FIGS. 9(A)~(F)) indicating whether IGBTs Q1 to Q6 can be turned on without flowing loop current IL. Control unit 23 (FIG. 4) generates gate signals G1 to G6 based on signals A1 to A6 and voltages between terminals VD1 and VD2 of capacitors C11 and C12, thereby controlling converter 2.

In control unit 23 (FIG. 10), voltage detectors 61 and 62 detect voltages between terminals VD1 and VD2 of capacitors C11 and C12, and target voltage generator 63 generates target voltage VDT. Subtractors 64 and 65 generate deviations ΔVD1 and ΔVD2 between output signals VD1f and VD2f of voltage detectors 61 and 62 and target voltage VDT. Duty ratio setting units 66 and 67 generate duty ratio setting signals DS1 and DS2 having values corresponding to deviations ΔVD1 and VD2.

Signal generation unit 69 adjusts the duty ratio of clock signal CLKA generated by oscillator 68 to generate clock signal CLK1, based on duty ratio setting signal DS1. When signals A1 to A3 are at "H" level, clock signal CLK1 passes through AND gates 71 to 73 to become gate signals G1 to G3. When gate signals G1 to G3 are rendered "H" level, IGBTs Q1 to Q3 (FIG. 1) are turned on, respectively. For example, when IGBT Q1 is turned on, a current flows from the positive electrode of capacitor C11 through IGBT Q1, reactor L1, and capacitor C1 to the negative electrode (node N6) of capacitor C11, so that voltage between terminals VD1 of capacitor C11 decreases slightly.

Signal generation unit 70 adjusts the duty ratio of clock signal CLKA to generate clock signal CLK2, based on duty ratio setting signal DS2. When signals A4 to A6 are at "H" level, clock signal CLK2 passes through AND gates 74 to 76 to become gate signals G4 to G6. When gate signals G4 to G6 are rendered "H" level, IGBTs Q4 to Q6 (FIG. 1) are turned on, respectively. For example, when IGBT Q5 is turned on, a current flows from the positive electrode (node N6) of capacitor C12 through capacitor C2, reactor L2, and IGBT Q5 to the negative electrode of capacitor C12, so that voltage between terminals VD2 of capacitor C12 decreases slightly.

When both of IGBTs Q1 and Q5 are turned on simultaneously, a current flows from the positive electrode of capacitor C11 through IGBT Q1, reactor L1, capacitors C1 and C2, reactor L2, and IGBT Q5 to the negative electrode of capacitor C12, so that voltages between terminals VD1 and VD2 of capacitors C11 and C12 decrease slightly.

When both of voltages between terminals VD1 and VD2 of capacitors C11 and C12 reach target voltage VDT and both of deviations ΔVD1 and ΔVD2 become zero, the duty ratios of clock signals CLK1 and CLK2 are set to zero by duty ratio setting units 66 and 67 and signal generation units 69 and 70. Consequently, gate signals G1 to G6 are rendered "L" level to turn off IGBTs Q1 to Q6, thereby stopping discharging of capacitors C11 and C12. In the case where capacitors C11 and C12 are discharged, IGBTs Q7 and Q8 (FIG. 1) of switches S1 to S3 are kept at OFF state.

Figure 12:
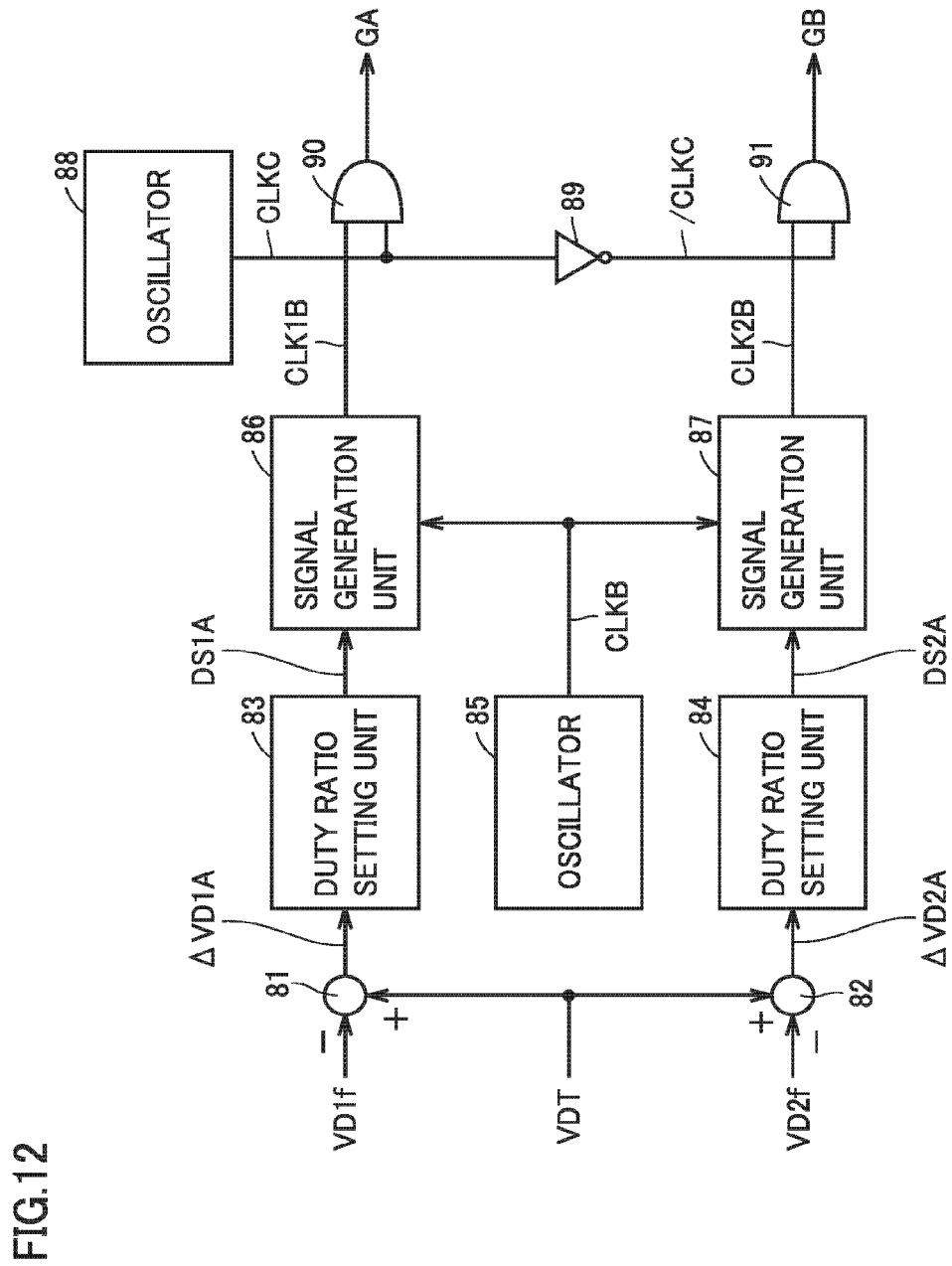
FIG. 12 is a block diagram showing a configuration of a part of the controller shown in FIG. 1, which controls the converter to charge capacitors C11 and C12.

FIG. 12 is a circuit block diagram showing a part of controller 5 (FIG. 1), which controls converter 2 to charge capacitors C11 and C12. As the current consumed by load 13 increases rapidly, each of voltages between terminals VD1 and VD2 of capacitors C11 and C12 falls below target voltage VDT. In this case, capacitors C11 and C12 need to be charged. With reference to FIG. 12, controller 5 includes subtractors 81 and 82, duty ratio setting units 83 and 84, oscillators 85 and 88, signal generation units 86 and 87, an inverter 89, and AND gates 90 and 91.

Subtractor 81 determines a deviation ΔVD1A=VDT−VD1f between target voltage VDT generated by target voltage generator 63 (FIG. 10) and output signal VD1f of voltage detector 61 (FIG. 10). Subtractor 82 determines a deviation ΔVD2A=VDT−VD2f between target voltage VDT and output signal VD2f of voltage detector 62 (FIG. 10).

Duty ratio setting unit 83 multiplies deviation ΔVD1A by a gain to generate a duty ratio setting signal DS1A. Duty ratio setting unit 84 multiplies deviation ΔVD2A by a gain to generate a duty ratio setting signal DS2A. Duty ratio setting signals DS1A and DS2A are supplied to signal generation units 86 and 87, respectively.

Oscillator 85 generates a clock signal CLKB having a frequency which is an integral multiple (e.g., eight times) of the frequencies of three-phase AC voltages Vu, Vv, and Vw in synchronization with three-phase AC voltages Vu, Vv, and Vw. Clock signal CLKB is supplied to signal generation units 86 and 87.

Signal generation unit 86 adjusts the duty ratio of clock signal CLKB to generate a clock signal CLK1B, based on duty ratio setting signal DS1A. The duty ratio of clock signal CLK1B is higher as deviation ΔV1DA is greater. Signal generation unit 87 adjusts the duty ratio of clock signal CLKB to generate a clock signal CLK2B, based on duty ratio setting signal DS2A. The duty ratio of clock signal CLK2B is higher as deviation ΔVD2A is greater.

Oscillator 88 generates a clock signal CLKC having a frequency which is an even multiple (e.g., four times) of the frequency of clock signal CLKB in synchronization with clock signal CLKB. Inverter 89 generates an inversion signal /CLKC of clock signal CLKC.

AND gate has a first input node that receives clock signal CLK1B and a second input node that receives clock signal CLKC. AND gate 91 has a first input node that receives clock signal CLK2B and a second input node that receives a clock signal /CLKC. The output signals of AND gates 90 and 91 become gate signals GA and GB, respectively. Gate signal GA is supplied to the gates of IGBTs Q7 (FIG. 1) of switches S1 to S3. Gate signal GB is supplied to the gates of IGBTs Q8 (FIG. 1) of switches S1 to S3.

When gate signal GA is at "H" level, IGBTs Q7 of switches S1 to S3 are turned on. In this case, any one diode of diodes D1 to D3 which corresponds to the highest voltage of three-phase AC voltages Vu, Vv, and Vw is turned on, and diode D8 of any one switch of switches S1 to S3 which corresponds to the lowest voltage of three-phase AC voltages Vu, Vv, and Vw is turned on, so that capacitor C11 is charged. When gate signal GA is at "L" level, IGBTs Q7 of switches S1 to S3 are turned off, so that charging of capacitor C11 is stopped.

When gate signal GB is at "H" level, IGBTs Q8 of switches S1 to S3 are turned on. In this case, diode D7 of any one switch of switches S1 to S3 which corresponds to the highest voltage of three-phase AC voltages Vu, Vv, and Vw is turned on, and any one diode of diodes D4 to D6 which corresponds to the lowest voltage of three-phase AC voltages Vu, Vv, and Vw is turned on, so that capacitor C12 is charged. When gate signal GB is at "L" level, IGBTs Q8 of switches S1 to S3 are turned off, so that charging of capacitor C12 is stopped.

Figure 13:
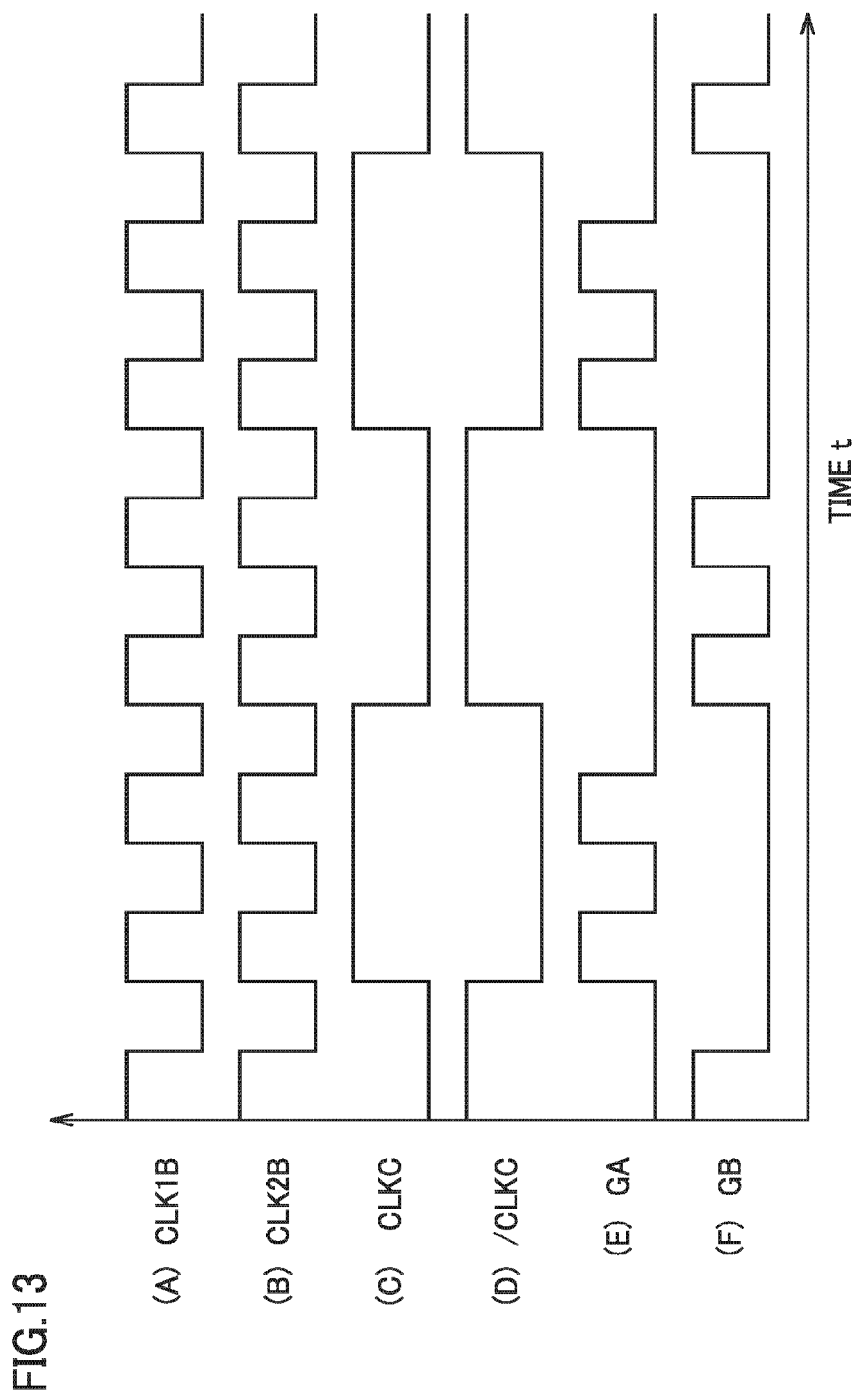
FIG. 13 is a timing diagram showing wave forms of a clock signal and a gate signal shown in FIG. 12.

FIGS. 13(A) to (F) are timing diagrams showing waveforms of clock signals CLK1B, CLK2B, CLKC, and /CLKC, and gate signals GA and GB. Clock signals CLK1B and CLK2B have a frequency which is an integral multiple (e.g., eight times) of the frequencies of three-phase AC voltages Vu, Vv, and Vw. FIGS. 13(A) and (B) show the case in which both of the duty ratios of clock signals CLK1B and CLK2B are 50%. Clock signal CLKC is in synchronization with clock signal CLKB and has a frequency which is an even multiple (e.g., four times) of the frequency of clock signal CLKB. Clock signal /CLKC is an inversion signal of clock signal CLKC.

During a period in which clock signal CLKC is at "H" level, clock signal CLK1B passes through AND gate 90 (FIG. 12) to become gate signal GA. During a period in which clock signal CLKC is at "L" level, gate signal GA that is the output signal of AND gate 90 is fixed at "L" level. Thus, IGBT Q7 is turned on and off during the period in which clock signal CLKC is at "H" level, and IGBT Q7 is kept at OFF state during the period in which clock signal CLKC is at "L" level.

During a period in which clock signal /CLKC is at "H" level, clock signal CLK2B passes through AND gate 91 (FIG. 12) to become gate signal GB. During a period in which clock signal /CLKC is at "L" level, gate signal GB that is the output signal of AND gate 91 is fixed at "L" level. Thus, IGBT Q8 is turned on and off during the period in which clock signal CLKC is at "L" level, and IGBT Q8 is kept at OFF state during the period in which clock signal CLKC is at "H" level.

Next, the method of charging capacitors C11 and C12 in this uninterruptible power supply apparatus will be described. Since DC output voltage Vdc of rectifier 3 is lower than a sum (2VDT) of target voltages VDT of voltages between terminals VD1 and VD2 of capacitors C11 and C12 (Vdc<2VDT), each of capacitors C11 and C12 needs to be charged by converter 2.

Voltage detectors 61 and 62 (FIG. 10) detect voltages between terminals VD1 and VD2 of capacitors C11 and C12, and target voltage generator 63 (FIG. 10) generates target voltage VDT. Subtractors 81 and 82 (FIG. 12) generate deviations ΔVD1A and VDT2A between target voltage VDT and output signals VD1ƒ and VD2ƒ of voltage detectors 61 and 62.

When each of voltages between terminals VD1 and VD2 of capacitors C11 and C12 is lower than target voltage VDT, duty ratio setting units 86 and 87 (FIG. 12) generate duty ratio setting signals DS1A and DS2A having values corresponding to deviations ΔVD1A and VDT2A.

Signal generation unit 86 (FIG. 12) adjusts the duty ratio of clock signal CLKB generated by oscillator 85 (FIG. 12) to generate clock signal CLK1B, based on duty ratio setting signal DS1A. Signal generation unit 87 adjusts the duty ratio of clock signal CLKB to generate clock signal CLK2B, based on duty ratio setting signal DS2A.

When clock signal CLKC generated by oscillator 88 is at "H" level, clock signal CLK1B passes through AND gate 90 to become gate signal GA. As gate signal GA is rendered "H" level, IGBTs Q7 of switches S1 to S3 are turned on.

As IGBTs Q7 of switches S1 to S3 are turned on, any one diode of diodes D1 to D3 which corresponds to the highest voltage of three-phase AC voltages Vu, Vv, and Vw is turned on, and the diode of any one switch of switches S1 to S3 which corresponds to the lowest voltage of three-phase AC voltages Vu, Vv, and Vw is turned on, so that capacitor C11 is charged.

When clock signal CLKC generated by oscillator 88 is at "L" level, clock signal CLK2B passes through AND gate 91 to become gate signal GB. As gate signal GB is rendered "H" level, IGBTs Q8 of switches S1 to S3 are turned on.

When IGBTs Q8 of switches S1 to S3 are turned on, diode D7 of any one switch of switches S1 to S3 which corresponds to the highest voltage of three-phase AC voltages Vu, Vv, and Vw is turned on, and any one diode of diodes D4 to D6 which corresponds to the lowest voltage of three-phase AC voltages Vu, Vv, and Vw is turned on, so that capacitor C12 is charged.

When both of voltages between terminals VD1 and VD2 of capacitors C11 and C12 reach target voltage VDT and both of deviations ΔVD1A and ΔVD2A become zero, the duty ratios of clock signals CLK1B and CLK2B are set to zero by duty ratio setting units 83 and 84 and signal generation units 86 and 87. Thus, gate signals GA and GB are rendered "L" level, and IGBTs Q7 and Q8 of switches S1 to S3 are turned off, so that charging of capacitors C11 and C12 is stopped. When capacitors C11 and C12 are to be charged, IGBTs Q1 to Q6 (FIG. 1) of converter 2 are kept at OFF state.

In Embodiment 1, when capacitors C11 and C12 are discharged, IGBTs Q1 to Q6 are each turned on and off during the period in which loop current IL does not flow even when IGBTs Q1 to Q6 are turned on, as described above. When capacitors C11 and C12 are to be charged, IGBTs Q1 to Q6 are kept at OFF state, and IGBTs Q7 and Q8 of switches S1 to S3 are each turned on and off. This can prevent a loss caused by a flow of loop current IL. Also, the cost of the device can be lower than in the case where a transformer is used to impede loop current IL.

Embodiment 2

Figure 14:
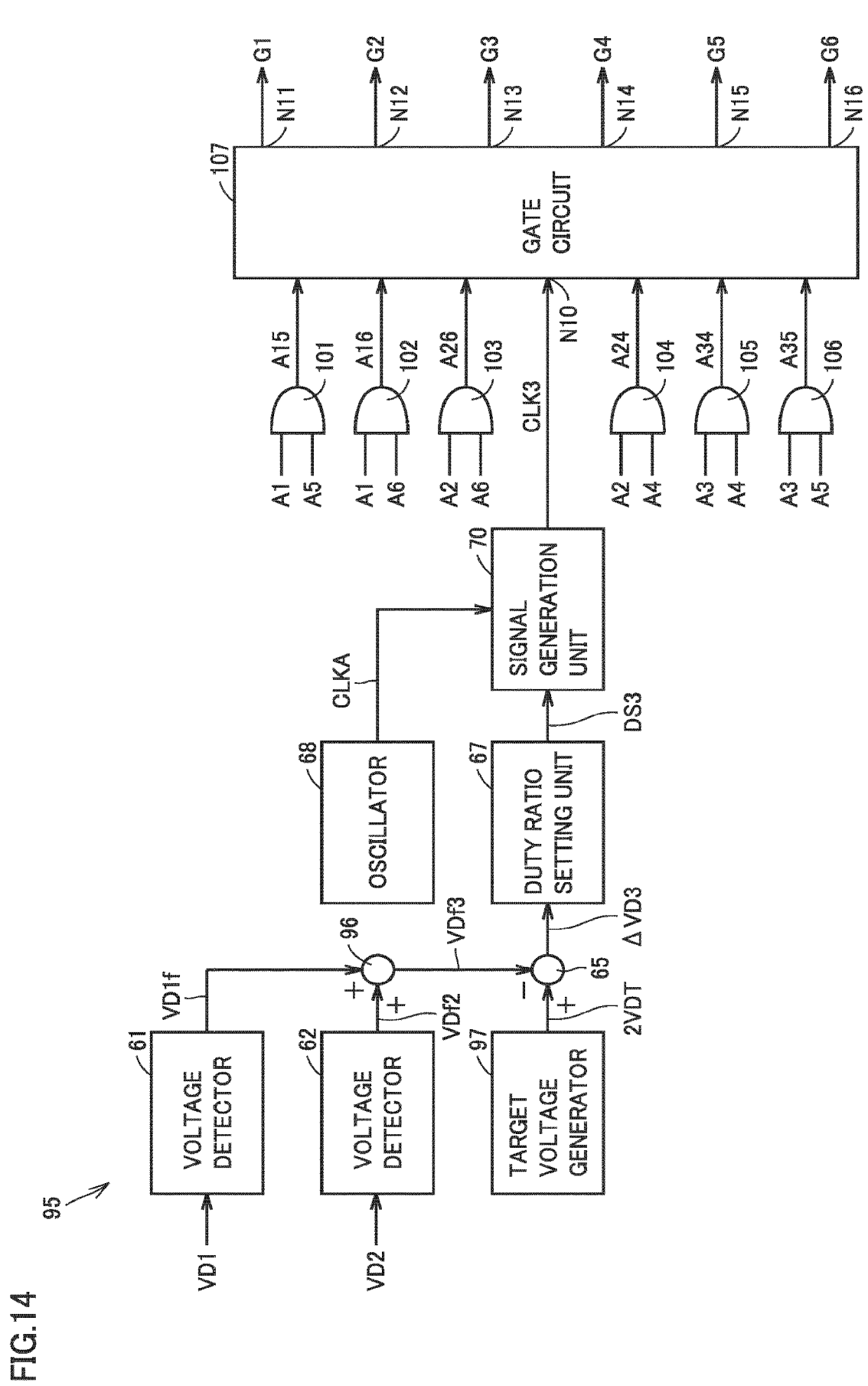
FIG. 14 is a circuit block diagram showing main parts of an uninterruptible power supply apparatus according to Embodiment 2 of the present invention.
Figure 15:
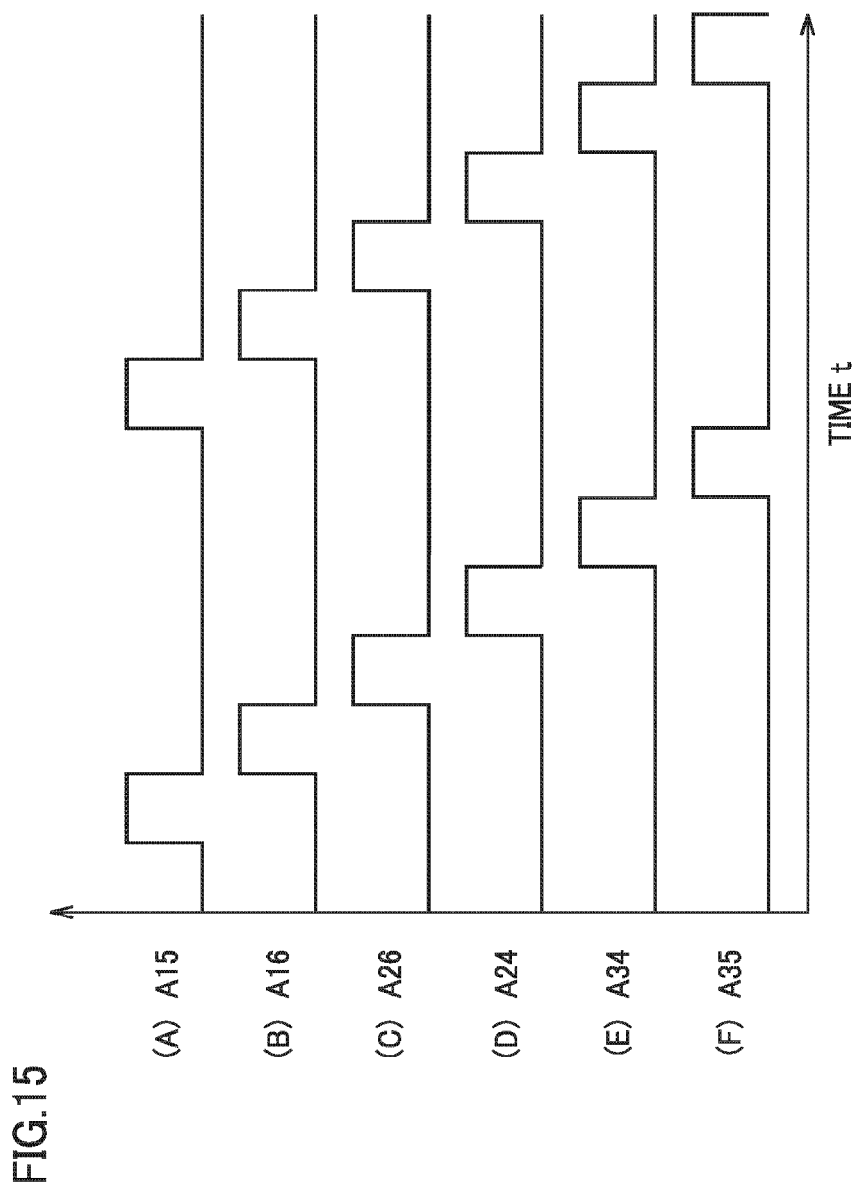
FIG. 15 is a timing diagram showing wave forms of signals A15, A16, A26, A24, A34, and A35 shown in FIG. 14.

FIG. 14 is a circuit block diagram showing main parts of an uninterruptible power supply apparatus according to Embodiment 2 of the present invention, which is compared with FIG. 10. Referring to FIG. 14, this uninterruptible power supply apparatus differs from the uninterruptible power supply apparatus of Embodiment 1 in that control unit 23 is replaced by a control unit 95. Control unit 95 simultaneously turns on any one IGBT of IGBTs Q1 to Q3 and any one IGBT of IGBTs Q4 to Q6 to discharge capacitors C11 and C12.

Control unit 95 includes voltage detectors 61 and 62, an adder 96, a target voltage generator 97, a subtractor 65, a duty ratio setting unit 67, an oscillator 68, a signal generation unit 70, AND gates 101 to 106, and a gate circuit 107.

Voltage detector 61 detects an instantaneous value of voltage between terminals VD1 of capacitor C11 and outputs signal VD indicative of the detected value. Voltage detector 62 detects an instantaneous value of voltage between terminals VD2 of capacitor C12 and outputs signal VD2ƒ indicative of the detected value. Adder 96 adds signal VD1ƒ and signal VD2ƒ together to generate a signal VD3ƒ. Target voltage generator 97 generates target voltage 2VDT.

Subtractor 65 determines a deviation ΔVD3=VD3ƒ−2VDT between signal VD3ƒ and target voltage 2VDT. Duty ratio setting unit 67 multiples deviation ΔVD3 by a gain to generate a duty ratio setting signal DS3. Oscillator 68 generates a clock signal CLKA of a frequency which is an integral multiple (e.g., six times) of the frequencies of three-phase AC voltages Vu, Vv, and Vw in synchronization with three-phase AC voltages Vu, Vv, and Vw. Signal generation unit 70 adjusts the duty ratio of clock signal CLKA to generate a clock signal CLK3, based on duty ratio setting signal DS3. The duty ratio of clock signal CLK3 is higher as deviation ΔVD3 is greater.

AND gate 101 generates an AND signal A15 of signals A1 and A5. AND gate 102 generates an AND signal A16 of signals A1 and A6. AND gate 103 generates an AND signal A26 of signals A2 and A6. AND gate 104 generates an AND signal A24 of signals A2 and A4. AND gate 105 generates an AND signal A34 of signals A3 and A4. AND gate 106 generates an AND signal A35 of signals A3 and A5.

FIGS. 15(A) to (F) are timing diagrams showing wave forms of signals A15, A16, A26, A24, A34, and A35, which are compared with FIGS. 9(A) to (F). In FIGS. 15(A) to (F), the frequency of each of signals A15, A16, A26, A24, A34, and A35 is equal to the frequency of each of signals A1 to A6, that is, the frequency of each of three-phase AC voltages Vu, Vv, and Vw.

Each of signals A15, A16, A26, A24, A34, and A35 is at "H" level for only 60 degrees of 360 degrees and is at "L" level for the other 300 degrees. Signals A15, A16, A26, A24, A34, and A35 are out of phase with respect to each other by 60 degrees. Any one signal of signals A15, A16, A26, A24, A34, and A35 is at "H" level.

Turning on of IGBT Q1 is allowed when signal A1 is at "H" level, and turning on of IGBT Q5 is allowed when signal A5 is at "H" level. Thus, turning on of both of IGBTs Q1 and Q5 is allowed when signal A15 is at "H" level.

Similarly, turning on of both of IGBTs Q1 and Q6 is allowed when signal A16 is at "H" level. Turing on of both of IGBTs Q2 and Q6 is allowed when signal A26 is at "H" level. Turning on of both of IGBTs Q2 and Q4 is allowed when signal A24 is at "H" level. Turning on of both of IGBTs Q3 and Q4 is allowed when signal A34 is at "H" level. Turning on of both of IGBTs Q3 and Q5 is allowed when signal A35 is at "H" level. It is not permitted to simultaneously turn on three or more IGBTs.

Referring back to FIG. 14, gate circuit 107 includes an input node N10 for receiving clock signal CLK3 from signal generation unit 70 and output nodes N11 to N16 for outputting gate signals G1 to G6, respectively.

Gate circuit 107 passes clock signal CLK3 through any two output nodes of six output nodes N11 to N16 in response to signals A15, A16, A26, A24, A34, and A35. When signal A15 is at "H" level, clock signal CLK3 passes through output nodes N11 and N15 to become gate signals G1 and G5. When signal A16 is at "H" level, clock signal CLK3 passes through output nodes N11 and N16 to become gate signals G1 and G6. When signal A26 is at "H" level, clock signal CLK3 passes through output nodes N12 and N16 to become gate signals G2 and G6.

When signal A24 is at "H" level, clock signal CLK3 passes through output nodes N12 and N14 to become gate signals G2 and G4. When signal A34 is at "H" level, clock signal CLK3 passes through output nodes N13 and N14 to become gate signals G3 and G4. When signal A35 is at "H" level, clock signal CLK3 passes through output nodes N13 and N15 to become gate signals G3 and G5.

Figure 16:
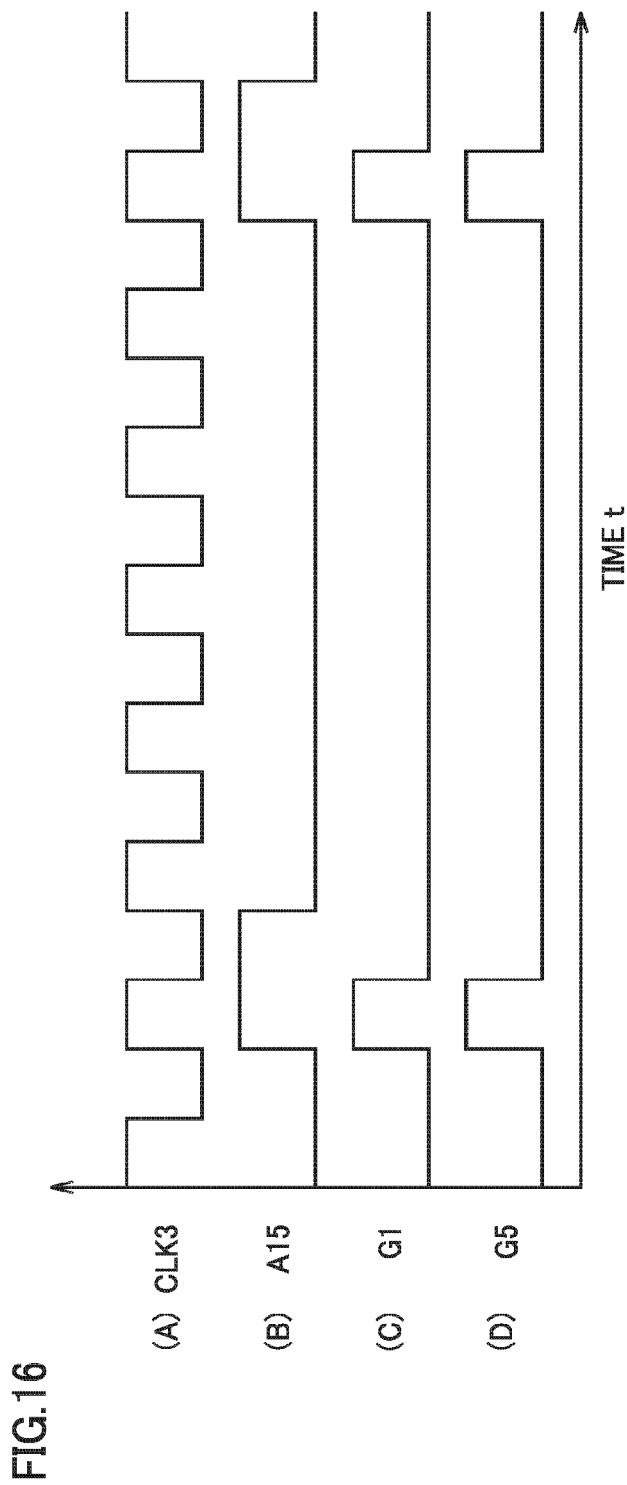
FIG. 16 is a timing diagram showing wave forms of a clock signal CLK3, a signal A15, and gate signals G1 and G5 shown in FIG. 14.

FIGS. 16(A) to (D) are timing diagrams showing wave forms of clock signal CLK3, signal A15, and gate signals G1 and G5, which are compared with FIGS. 11(A) to (C). Clock signal CLK3 has a frequency which is an integral multiple (e.g., six times) of the frequencies of three-phase AC voltages Vu, Vv, and Vw. Clock signal CLK3 and signal A15 are in synchronization with each other. FIG. 16(A) shows the case where the duty ration which is the ratio between a time in which clock signal CLK3 is at "H" level and one cycle of clock signal CLK3 is 50%.

During a period in which signal A15 is at "H" level, clock signal CLK3 passes through gate circuit 107 (FIG. 14) to become gate signals G1 and G5. During a period in which signal A15 is at "L" level, both of gate signals G1 and G5 are fixed at "L" level. Thus, IGBTs Q1 and Q5 are simultaneously turned on and off during the period in which signal A15 is at "H" level, and IGBTs Q1 and Q5 are kept at OFF state during the period in which signal A15 is at "L" level.

Next, the method of discharging capacitors C11 and C12 in this uninterruptible power supply apparatus will be described. When a load current decreases during the operation of load 13, load 13 stops suddenly, or a regenerative current is generated in load 13, a sum (VD1+VD2) of voltages between terminals VD1 and VD2 of capacitors C11 and C12 exceeds target voltage 2VDT. In this case, capacitors C11 and C12 need to be discharged to decrease voltages between terminals VD1 and VD2 of capacitors C11 and C12.

First, line voltage detection unit 21 (FIG. 4) detects line voltages Vuv, Vuw, Vvw, Vvu, Vwu, and Vwv, and based on the detection result, comparison unit 22 (FIG. 4) generates signals A1 to A6 (FIGS. 9(A) to (F)) indicating whether IGBTs Q1 to Q6 can be turned on without flowing loop current IL. Control unit 95 (FIG. 14) generates gate signals G1 to G6 based on signals A1 to A6 and voltages between terminals VD1 and VD2 of capacitors C11 and C12.

In control unit 95 (FIG. 14), voltage detectors 61 and 62 detect voltages between terminals VD1 and VD2 of capacitors C11 and C12, adder 96 adds up output signals VD1$f$ and VD2$f$ of voltage detectors 61 and 62 to generate signal VD3$f$=VD1$f$+VD2$f$, and target voltage generator 97 generates target voltage 2VDT. Subtractor 65 generates deviation ΔVD3 between target voltage VDT and signal VD3$f$. Duty ratio setting unit 67 generates a duty ratio setting signal DS3 having a value corresponding to deviation ΔVD3.

Signal generation unit 70 adjusts the duty ratio of clock signal CLKA generated by oscillator 68 to generate clock signal CLK3, based on duty ratio setting signal DS3. Clock signal CLK3 is supplied to gate circuit 107.

AND gates 101 to 106 generate signals A15, A16, A26, A24, A34, and A35 based on signals A1 to A6 from comparison unit 22 (FIG. 4). Gate circuit 107 passes clock signal CLK3 through any two output nodes of six output nodes N11 to N16 to generate gate signals G1 to G6, based on signals A15, A16, A26, A24, A34, and A35.

When gate signals G1 to G6 are rendered "H" level, IGBTs Q1 to Q6 (FIG. 1) are respectively turned on. For example, when both of IGBTs Q1 and Q5 are simultaneously turned on, a current flows from the positive electrode of capacitor C11 through IGBT Q1, reactor L1, capacitors C1 and C2, reactor L2, and IGBT Q5 to the negative electrode of capacitor C12, so that voltages between terminals VD1 and VD2 of capacitors C11 and C12 decrease slightly.

When a voltage (VD1+VD2), which is a sum of voltages between terminals VD1 and VD2 of capacitors C11 and C12, reaches target voltage 2VDT and deviation ΔVD3 becomes zero, the duty ratio of clock signal CLK3 is set to zero by duty ratio setting unit 67 and signal generation unit 70. As a result, gate signals G1 to G6 are rendered "L" level to turn off IGBTs Q1 to Q6, so that discharging of capacitors C11 and C12 is stopped.

The other components and operations are similar to those of Embodiment 1, description of which will not be repeated. Embodiment 2 achieves the same effects as those of Embodiment 1.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

T1-T3 input terminal, T4 battery terminal, T11, T12 output terminal, 1 filter, 2 converter, C1-C3, C11, C12 capacitor, 3 rectifier, 4 bidirectional chopper, 5 controller, 11 AC power supply, 12 battery, 13 load, L1-L3 reactor, Q1-Q8 IGBT, D1-D8, D11-D16 diode, S1-S3 AC switch, 21 line voltage detection unit, 22 comparison unit, 22$a$-22$f$ comparator circuit, 23 control unit, 31-42 comparator, 51-56, 71-76, 90, 91, 101-106 AND gate, 61, 62 voltage detector, 63, 97 target voltage generator, 64, 65, 81, 82 subtractor, 66, 67, 83, 84 duty ratio setting unit, 68, 85, 88 oscillator, 69, 70, 86, 87 signal generation unit, 89 inverter, 96 adder, 107 gate circuit.

The invention claimed is:
1. A power conversion apparatus comprising:
   a converter that generates first to third DC voltages based on first to third AC voltages supplied from an AC power supply and outputs the first to third DC voltages to first to third output nodes, respectively;
   a first capacitor connected between the first and second output nodes;

a second capacitor connected between the second and third output nodes;
a controller that controls the converter such that each of voltages between terminals of the first and second capacitors attains to a target voltage; and
a rectifier that rectifies the first to third AC voltages and outputs a fourth DC voltage to between the first and third output nodes,
the converter including
first to third transistors respectively provided corresponding to the first to third AC voltages, each of the first to third transistors having a first electrode connected to the first output node and a second electrode that receives a corresponding AC voltage,
fourth to sixth transistors respectively provided corresponding to the first to third AC voltages, each of the fourth to sixth transistors having a first electrode that receives a corresponding AC voltage and a second electrode connected to the third output node,
first to sixth diodes respectively connected in antiparallel with the first to sixth transistors, and
first to third AC switches respectively provided corresponding to the first to third AC voltages, each of the first to third AC switches having a first terminal that receives a corresponding AC voltage and a second terminal connected to the second output node,
the controller including
first to third comparator circuits respectively provided corresponding to the first to third transistors, each of the first to third comparator circuits comparing magnitude of the first to third AC voltages and outputting a signal that allows a corresponding transistor to be turned on when an AC voltage corresponding to the corresponding transistor is higher than other two AC voltages,
fourth to sixth comparator circuits respectively provided corresponding to the fourth to sixth transistors, each of the fourth to sixth comparator circuits comparing magnitude of the first to third AC voltages and outputting a signal that allows a corresponding transistor to be turned on when an AC voltage corresponding to the corresponding transistor is lower than other two AC voltages, and
a control unit that, when the voltage between terminals of at least any one capacitor of the first and second capacitors is higher than the target voltage, turns on and off each of the first to sixth transistors based on signals output from the first to sixth comparator circuits to decrease the voltage between terminals of the at least any one capacitor of the first and second capacitors.

2. The power conversion apparatus according to claim 1, wherein
when the voltage between terminals of the first capacitor is higher than the target voltage, the control unit turns on and off a transistor of the first to third transistors which is allowed to be turned on by the signals output from the first to third comparator circuits to decrease the voltage between terminals of the first capacitor, and
when the voltage between terminals of the second capacitor is higher than the target voltage, the control unit turns on and off a transistor of the fourth to sixth transistors which is allowed to be turned on by the signals output from the fourth to sixth comparator circuit, to decrease the voltage between terminals of the second capacitor.

3. The power conversion apparatus according to claim 2, wherein the control unit includes
a first signal generation unit that generates a first clock signal having a duty ratio corresponding to a deviation between the voltage between terminals of the first capacitor and the target voltage,
a first gate circuit that supplies the first clock signal to a gate of the transistor of the first to third transistors which is allowed to be turned on by the signals output from the first to third comparator circuits,
a second signal generation unit that generates a second clock signal having a duty ratio corresponding to a deviation between the voltage between terminals of the second capacitor and the target voltage, and
a second gate circuit that supplies the second clock signal to a gate of the transistor of the fourth to sixth transistors which is allowed to be turned on by the signals output from the fourth to sixth comparator circuits.

4. The power conversion apparatus according to claim 1, wherein when a sum of the voltages between terminals of the first and second capacitors is higher than a voltage twice as high as the target voltage, the control unit simultaneously turns on and off a transistor of the first to third transistors which is allowed to be turned on by the signals output from the first to third comparator circuits and a transistor of the fourth to sixth transistors which is allowed to be turned on by the signals output from the fourth to sixth comparator circuits, to decrease the voltages between terminals of the first and second capacitors.

5. The power conversion apparatus according to claim 4, wherein the control unit includes
a signal generation unit that generates a clock signal having a duty ratio corresponding to a deviation between the sum of the voltages between terminals of the first and second capacitors and the voltage twice as high as the target voltage, and
a gate circuit that supplies the clock signal to the gate of the transistor of the first to third transistors which is allowed to be turned on by the signals output from the first to third comparator circuits and supplies the clock signal to the gate of the transistor of the fourth to sixth transistors which is allowed to be turned on by the signals output from the fourth to sixth comparator circuits.

6. The power conversion apparatus according to claim 1, wherein each of the first to third AC switches includes
seventh and eighth transistors having first electrodes connected to each other and second electrodes respectively connected to the first terminal and the second terminal, and
seventh and eighth diodes respectively connected in antiparallel with the seventh and eighth transistors.

7. The power conversion apparatus according to claim 6, wherein
when the voltage between terminals of the first capacitor is lower than the target voltage, the controller turns on and off the seventh transistors of the first to third AC switches to increase the voltage between terminals of the first capacitor, and
when the voltage between terminals of the second capacitor is lower than the target voltage, the controller turns on and off the eighth transistors of the first to third AC switches to increase the voltage between terminals of the second capacitor.

8. The power conversion apparatus according to claim 7, wherein the controller includes a first signal generation unit that generates a first clock signal having a duty ratio corresponding to a deviation between the target voltage and the voltage between terminals of the first capacitor, a second signal generation unit that generates a second clock signal having a duty ratio corresponding to a deviation between the target voltage and the voltage between terminals of the second capacitor, and a gate circuit that receives the first and second clock signals, supplies the first clock signal to gates of the seventh transistors of the first to third AC switches during a first period, and supplies the second clock signal to gates of the eighth transistors of the first to third AC switches during a second period.

9. The power conversion apparatus according to claim 1, wherein the rectifier includes seventh to ninth diodes having anodes that receive the first to third AC voltages and cathodes connected together to the first output node, and tenth to twelfth diodes having anodes connected together to the third output node and cathodes respectively connected to anodes of the seventh to ninth diodes.

10. The power conversion apparatus according to claim 1, wherein a voltage twice as high as the target voltage is higher than the fourth DC voltage, a load is connected between the first and third output nodes, and the converter supplies DC power to the load during normal operation of the converter, and the rectifier supplies DC power to the load during failure of the converter.

11. The power conversion apparatus according to claim 10, further comprising a bidirectional chopper connected to the first and third output nodes, the bidirectional chopper storing the DC power from the rectifier and the DC power from the converter in a power storage device during normal operation of the AC power supply and supplying the DC power of the power storage device in the load during power failure of the AC power supply, wherein the controller stops an operation of the converter during power failure of the AC power supply.

* * * * *